US012220720B2

(12) United States Patent
Duong et al.

(10) Patent No.: US 12,220,720 B2
(45) Date of Patent: Feb. 11, 2025

(54) ANGULARLY ADJUSTED SPRAY NOZZLE

(71) Applicant: Melnor, Inc., Winchester, VA (US)

(72) Inventors: Ha V Duong, Winchester, VA (US); Vicky A Michael, Winchester, VA (US); Juergen Nies, Winchester, VA (US); Mark Hoyle, Winchester, VA (US)

(73) Assignee: Melnor, Inc., Winchester, VA (US)

( * ) Notice: Subject to any disclaimer, the term of this patent is extended or adjusted under 35 U.S.C. 154(b) by 0 days.

(21) Appl. No.: 18/233,005

(22) Filed: Aug. 11, 2023

(65) Prior Publication Data

US 2023/0381805 A1 Nov. 30, 2023

Related U.S. Application Data

(60) Continuation of application No. 17/977,162, filed on Oct. 31, 2022, now Pat. No. 11,766,691, which is a (Continued)

(51) Int. Cl.
*B05B 15/68* (2018.01)
*B05B 1/16* (2006.01)
(Continued)

(52) U.S. Cl.
CPC ............ *B05B 15/68* (2018.02); *B05B 1/1654* (2013.01); *B05B 11/001* (2013.01); (Continued)

(58) Field of Classification Search
CPC ......... B05B 1/16; B05B 1/1654; B05B 1/169; B05B 9/01; B05B 1/02; B05B 11/001; B05B 15/652; B05B 15/68
(Continued)

(56) References Cited

U.S. PATENT DOCUMENTS 3,094,283 A 6/1963 Balister
5,887,800 A 3/1999 McClosky
(Continued)

OTHER PUBLICATIONS

China Office Action in App. No. 201810249655, dated Sep. 27, 2020.

*Primary Examiner* — Christopher S Kim
(74) *Attorney, Agent, or Firm* — HEA Law PLLC; Darrin A. Auito

(57) ABSTRACT

According to some illustrative embodiments, an angularly adjustable spray nozzle is employed that includes: a base section having a water flow path extending lengthwise there-through; a head section aligned at an end of the base section and rotatably mounted to the base section; wherein a flow path through the base section is inclined at an angle to a flow path through the head section such that when the head section is rotated a predetermined extent relative to the base section, the spray device is moved between a substantially straight configuration of the head section with respect to the base section and an angular configuration of the head section with respect to the base section; wherein the head section includes a rotatable turret assembly having a plurality of selectable spray type discharge ports and a sleeve to which the rotatable turret assembly is mounted, the rotatable turret assembly including labels on a periphery thereof corresponding to respective ones of the selectable spray type discharge ports, and the sleeve having a plurality of windows through which the labels are viewed when aligned; and wherein the spray device is configured such that when the spray device is oriented in a generally horizontal use position a respective one of the labels corresponding to a selected spray type is displayed within a respective one of the windows that is located at a top side of the sleeve whether the spray device is in the substantially straight configuration or in the angular configuration.

2 Claims, 22 Drawing Sheets

Related U.S. Application Data continuation of application No. 16/802,853, filed on Feb. 27, 2020, now Pat. No. 11,517,930, which is a division of application No. 15/926,338, filed on Mar. 20, 2018, now Pat. No. 10,610,879.

(60) Provisional application No. 62/475,493, filed on Mar. 23, 2017.

(51) Int. Cl.

| | |
|---|---|
| ***B05B 11/00*** | (2023.01) |
| ***B05B 15/652*** | (2018.01) |
| *B05B 1/02* | (2006.01) |
| *B05B 9/01* | (2006.01) |

(52) U.S. Cl.

CPC .............. *B05B 15/652* (2018.02); *B05B 1/02* (2013.01); *B05B 1/169* (2013.01); *B05B 9/01* (2013.01)

(58) Field of Classification Search

USPC ............ 239/391, 392, 394, 397, 526, 587.2, 239/587.5, 587.6, 1

See application file for complete search history.

(56) References Cited

U.S. PATENT DOCUMENTS

| | | | | |
|---|---|---|---|---|
| 6,257,505 | B1 | 7/2001 | Wang | |
| 6,508,415 | B2 | 1/2003 | Wang | |
| 6,511,001 | B1 | 1/2003 | Huang | |
| 6,540,159 | B1 | 4/2003 | Wang | |
| 6,712,294 | B1 | 3/2004 | Wang | |
| 8,313,047 | B2 | 11/2012 | Micheli | |
| 9,427,759 | B2 | 8/2016 | Chiu | |
| 9,427,760 | B2 | 8/2016 | Chiu | |
| 10,610,879 | B2 | 4/2020 | Duong et al. | |
| 11,766,691 | B2 * | 9/2023 | Duong | B05B 11/001 239/526 |
| 2002/0170983 | A1 | 11/2002 | Wang | |
| 2011/0121105 | A1 | 5/2011 | Moriarty et al. | |
| 2020/0188949 | A1 | 6/2020 | Duong et al. | |

* cited by examiner

SECTION D-D

SECTION B-B

LINEAR POSITION

ROTATED POSITION

ANGULARLY ADJUSTED SPRAY NOZZLE

CROSS-REFERENCE TO RELATED APPLICATION

This application is a Continuation of copending U.S. application Ser. No. 17/977,162, which is a continuation of U.S. application Ser. No. 16/802,853, filed on Feb. 27, 2020 (now U.S. Pat. No. 11,517,930), which is a Division of U.S. application Ser. No. 15/926,338, filed on Mar. 20, 2018 (now U.S. Pat. No. 10,610,879), which claims priority to U.S. Provisional Application No. 62/475,493, filed on Mar. 23, 2017, entitled Angularly Adjusted Spray Nozzle, the entire disclosures of which are incorporated herein by reference.

FIELD OF THE INVENTION

The present invention relates generally to spray devices and preferred embodiments relate to an angularly adjustable spray device for dispensing water.

BACKGROUND

The present application improves upon existing spray devices, such as, e.g., the systems and methods taught in the following documents, the entire disclosures of which are incorporated herein by reference:

(1) U.S. Pat. No. 6,257,505 entitled Sprinkling Head Structure of Sprinkling Gun to Wang;

(2) U.S. Pat. No. 6,508,415 entitled Spray Head With a Pivot Nozzle to Wang;

(3) U.S. Pat. No. 9,427,760 entitled LED-Illuminated Water Spraying Gun to Chiu; and (4) U.S. Patent Pub. No. 2011/0121105 entitled Multi-Positional Handheld Fluid Powered Spray Device with Detacheable Accessories to Moriarty, et al.

SUMMARY OF THE PREFERRED EMBODIMENTS

The preferred embodiments overcome various deficiencies and/or problems in the above and other background art.

According to some illustrative embodiments of the invention, an angularly adjustable spray device is provided that includes: a base section having a water flow path extending lengthwise there-through; a head section aligned at an end of the base section and rotatably mounted to the base section; wherein a flow path through the base section is inclined at an angle to a flow path through the head section such that when the head section is rotated a predetermined extent relative to the base section, the spray device is moved between a substantially straight configuration of the head section with respect to the base section and an angular configuration of the head section with respect to the base section; wherein the head section includes a rotatable turret assembly having a plurality of selectable spray type discharge ports and a sleeve to which the rotatable turret assembly is mounted, the rotatable turret assembly including labels on a periphery thereof corresponding to respective ones of the selectable spray type discharge ports, and the sleeve having a plurality of windows through which the labels are viewed when aligned; and wherein the spray device is configured such that when the spray device is oriented in a generally horizontal use position a respective one of the labels corresponding to a selected spray type is displayed within a respective one of the windows that is located at a top side of the sleeve whether the spray device is in the substantially straight configuration or in the angular configuration.

In some examples, the angularly adjustable spray device further includes that the spray device is further configured such that a type of spray type discharge port selected remains the same despite rotation of the head section relative to the base section between the substantially straight configuration and the angular configuration.

In some examples, the angularly adjustable spray device further includes that the predetermined extent is approximately 180 degrees around an axis through the base section.

In some examples, the plurality of windows includes two windows located on opposite sides around a periphery of the sleeve.

In some examples, the head section includes an attachment member having an angled diverting tube that extends through the sleeve, the angled diverting tube having a discharge port that is alignable with a plurality of inlet holes in the turret assembly for respective spray types.

In some other examples, the head section includes an attachment member having an inlet tube that is snap fit into an outlet tube of the base section for mounting of the head section to the base section.

In some other examples, the head section includes a resilient detent member that engages receiving slits or holes in the base section for aligning the head section to the base section in a desired orientation.

According to some other embodiments, a method of operating an angularly adjustable spray device, comprising: 1) providing an angularly adjustable spray device having: a base section having a water flow path extending lengthwise there-through; a head section aligned at an end of the base section and rotatably mounted to the base section; wherein a flow path through the base section is inclined at an angle to a flow path through the head section such that when the head section is rotated a predetermined extent relative to the base section, the spray device is moved between a substantially straight configuration of the head section with respect to the base section and an angular configuration of the head section with respect to the base section; wherein the head section includes a rotatable turret assembly having a plurality of selectable spray type discharge ports and a sleeve to which the rotatable turret assembly is mounted, the rotatable turret assembly including labels on a periphery thereof corresponding to respective ones of the selectable spray type discharge ports, and the sleeve having a plurality of windows through which the labels are viewed when aligned; and wherein the spray device is configured such that when the spray device is oriented in a generally horizontal use position a respective one of the labels corresponding to a selected spray type is displayed within a respective one of the windows that is located at a top side of the sleeve whether the spray device is in the substantially straight configuration or in the angular configuration; 2) orienting the spray device in a generally horizontal use position with the spray device in a substantially straight configuration with a respective one of the labels corresponding to a selected spray type displayed via a first window that is located at a top side of the sleeve; and 3) rotating the sleeve relative to the base section by 180 degrees such that the spray device is in an angular configuration, without rotating the turret assembly relative to the sleeve, such that a second window on an opposite side of the sleeve is located at a top side of the sleeve and the first window is located at a bottom side of the sleeve.

In some examples, the method further includes displaying the same spray type label via the first window when the spray device is in the substantially straight configuration and via the second window when the spray device is in the angular configuration without rotating the turret assembly relative to the sleeve.

In some other embodiments, an angularly adjustable spray device is provided that includes: a base section having a water flow path extending lengthwise there-through; a head section aligned at an end of the base section and rotatably mounted to the base section; wherein a front face of the base section is inclined at an angle such that when the head section is rotated a predetermined extent relative to the base section, the spray device is moved between a substantially linear position of the head section with respect to the base section to angular position of the head section with respect to the base section; wherein the head section includes a rotatable turret having a plurality of selectable spray type discharge ports; and wherein the spray device is configured such that a water flow path through the head section maintains a consistent discharge orientation from an and end face of the head section despite rotation of the head section relative to the base section.

In some examples, the spray device is further configured such that a type of spray type discharge port selected remains the same despite rotation of the head section relative to the base section between the substantially linear position and the angular position.

In some other examples, the predetermined extent is approximately 180 degrees around an axis through the base section.

In some other examples, the base section has a diverter member fixedly attached thereto which diverts the flow path to be radially stepped from a center axis through the base section.

In some other examples, the head section includes a cap portion that is rotatably mounted to the diverter member and that includes two channels that are separately aligned with the radially stepped flow path depending on the rotation position of the head section.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 5A-5E and 6A-6E are various views of the spray device shown in FIG. 1 in an assembled state, with FIGS. 5A-5E showing views of the assembled spray device in a linear position and FIGS. 6A-6E showing views of the assembled spray device in an angular position, wherein:

FIG. 5A is a top view of the spray device shown in FIG. 1 in a linear position;

FIG. 5B is a cross-sectional side view of the spray device shown in FIG. 5A taken along the axis D-D shown in FIG. 5A;

FIG. 5C is a bottom view of the spray device shown in FIG. 5A;

FIG. 5D is an end view of the end face of a nozzle head of the spray device shown in FIG. 5A;

FIG. 5E is a perspective top view of the spray device shown in FIG. 5A;

FIG. 6A is a top view of the spray device shown in FIG. 1 in an angular position;

FIG. 6B is a cross-sectional side view of the spray device shown in FIG. 6A taken along the axis C-C shown in FIG. 6A;

FIG. 6C is a bottom view of the spray device shown in FIG. 6A;

FIG. 6D is a perspective end view of the end face of a nozzle head of the spray device shown in FIG. 6A;

FIG. 6E is a perspective top view of the spray device shown in FIG. 6A;

FIGS. 7A-7E and 8A-8E are various views of an alternate second embodiment of a spray device similar to that shown in FIG. 1 in an assembled state, with FIGS. 7A-7E showing views of the assembled spray device in a linear position and FIGS. 8A-8E showing views of the assembled spray device in an angular position, wherein:

FIG. 7A is a top view of the spray device according to this alternative embodiment in a linear position;

FIG. 7B is a cross-sectional side view of the spray device shown in FIG. 7A taken along the axis B-B shown in FIG. 7A;

FIG. 7C is a bottom view of the spray device shown in FIG. 7A;

FIG. 7D is an end view of the end face of a nozzle head of the spray device shown in FIG. 7A;

FIG. 7E is a perspective top view of the spray device shown in FIG. 7A;

FIG. 8A is a top view of the spray device of FIG. 7A shown in an angular position;

FIG. 8B is a cross-sectional side view of the spray device shown in FIG. 8A taken along the axis A-A shown in FIG. 8A;

FIG. 8C is a bottom view of the spray device shown in FIG. 8A;

FIG. 8D is a perspective end view of the end face of a nozzle head of the spray device shown in FIG. 8A;

FIG. 8E is a perspective top view of the spray device shown in FIG. 8A;

Figure 10A:
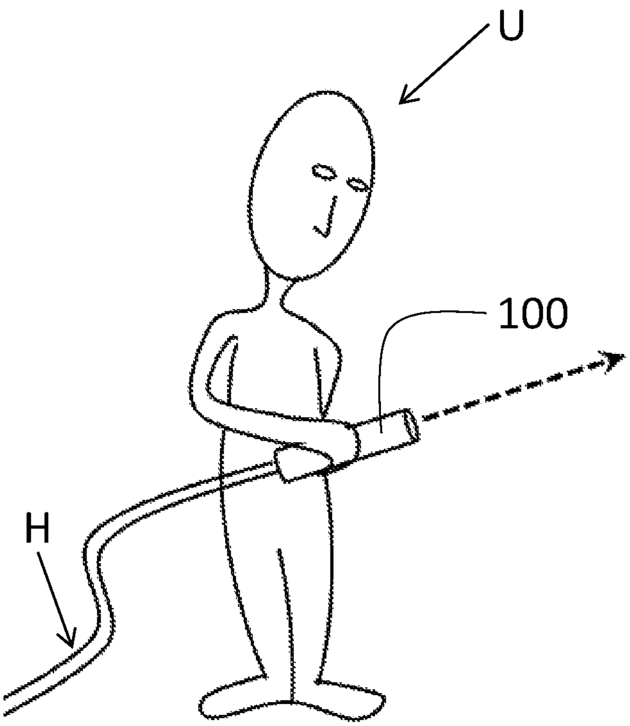
Figure 10B:
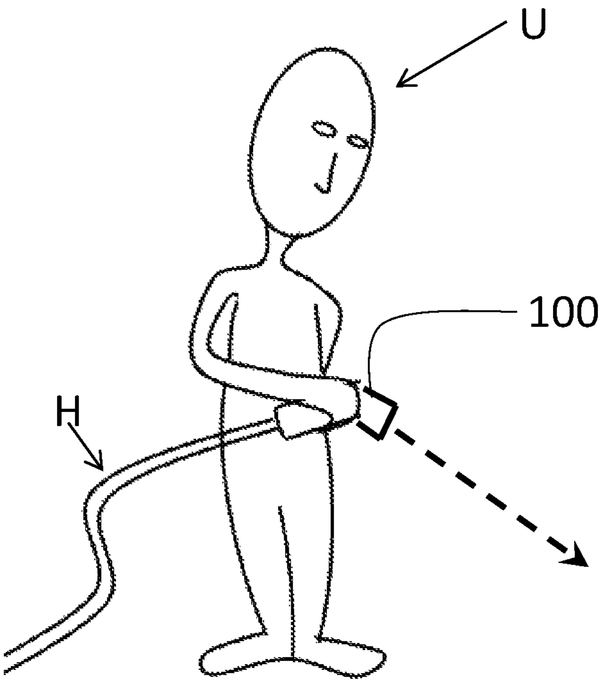
Figure 11A:
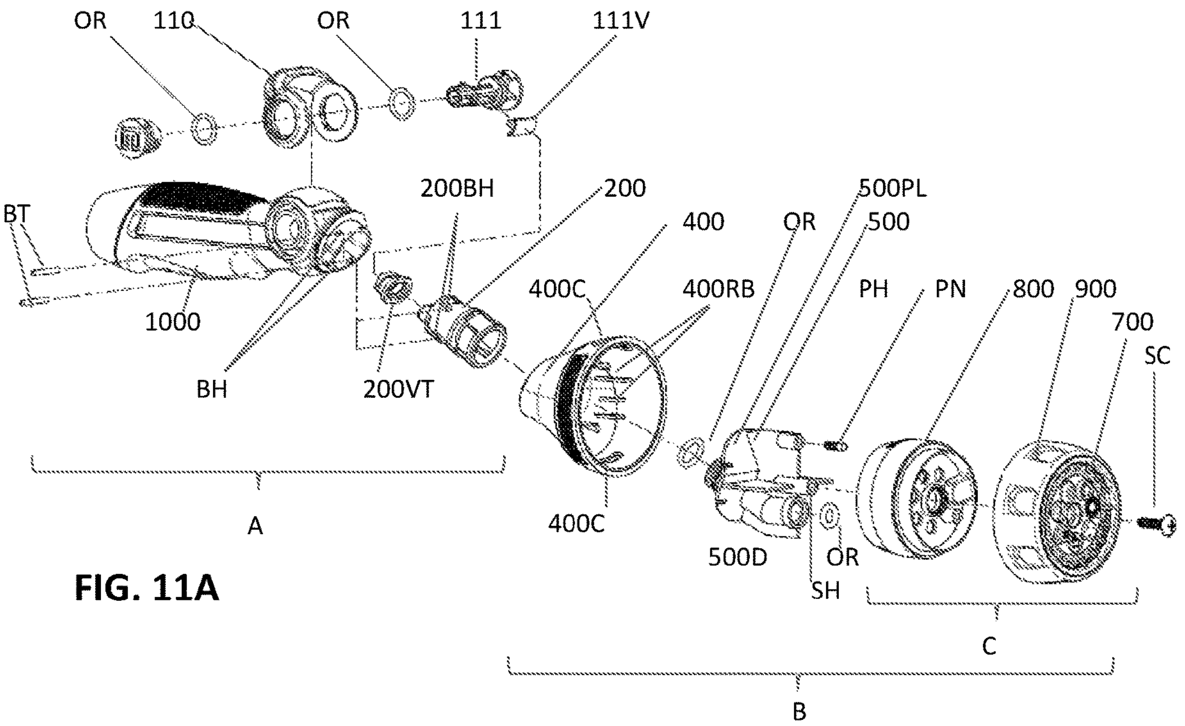
Figure 11B:
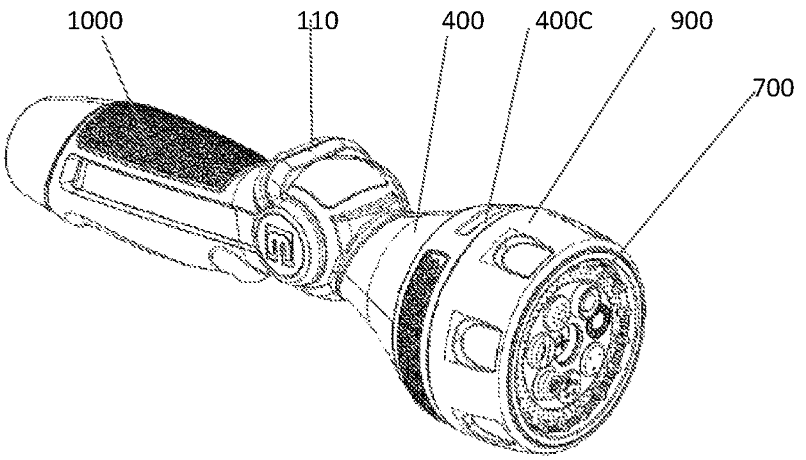
Figure 12A:
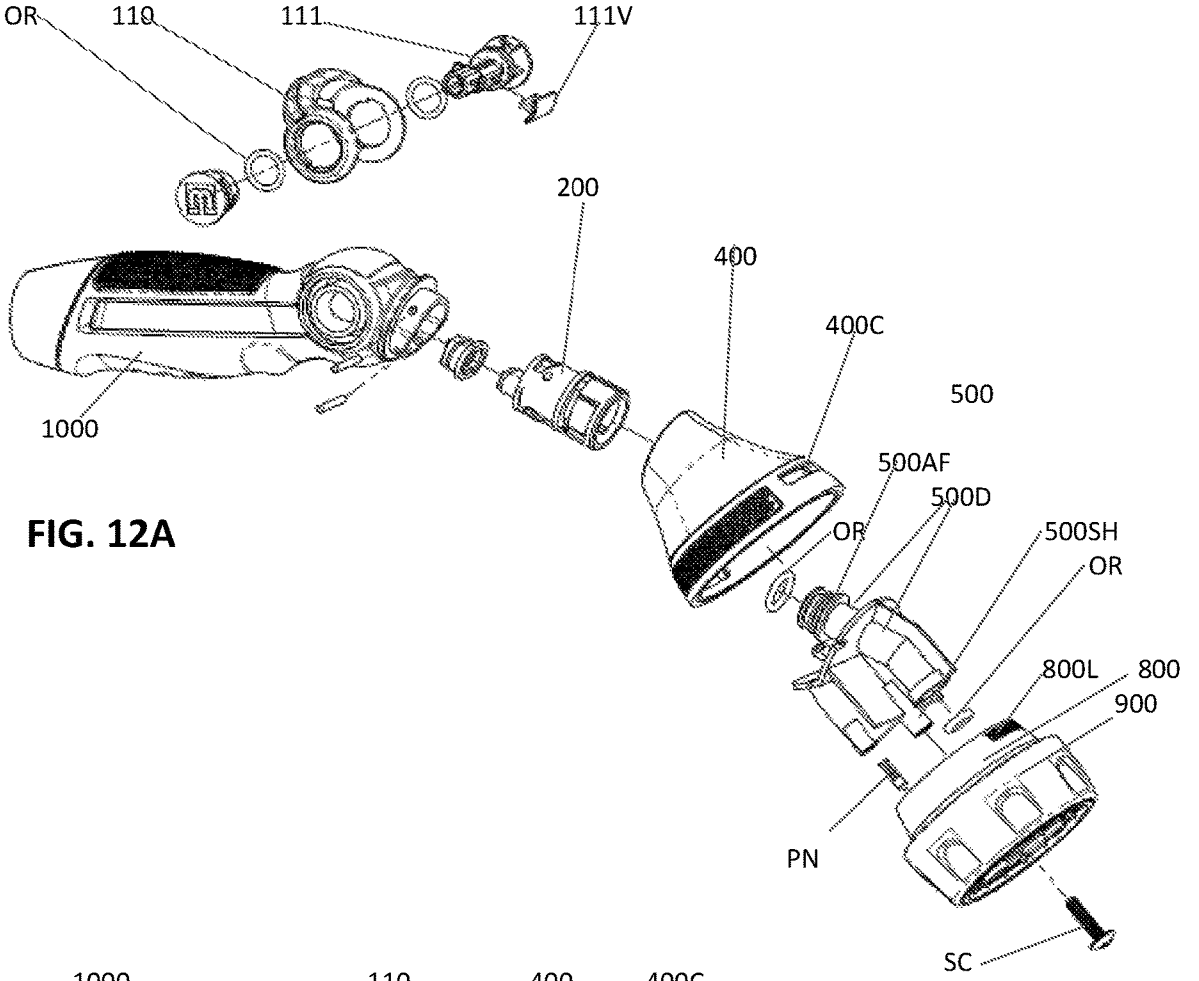
Figure 12B:
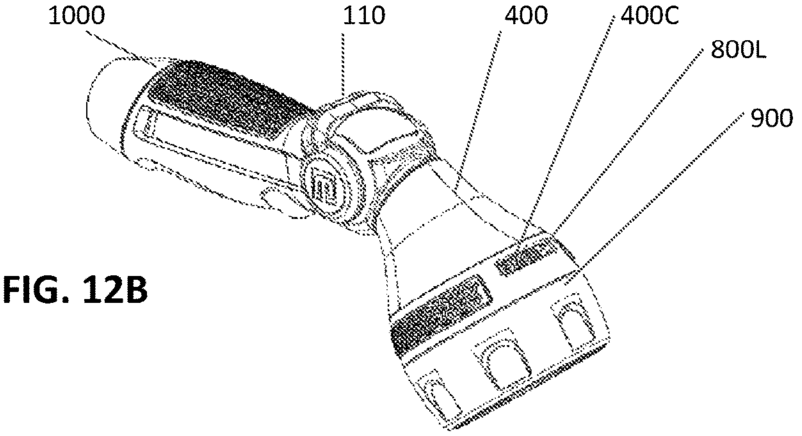
Figure 13:
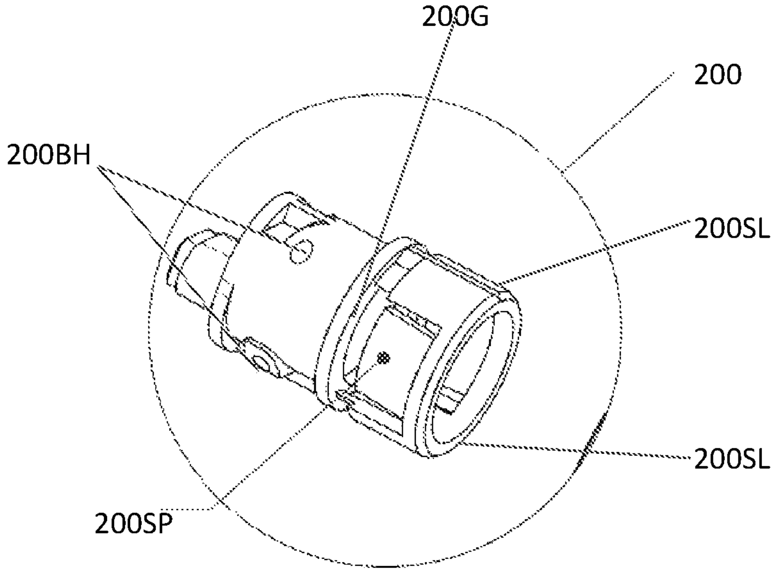
Figure 14:
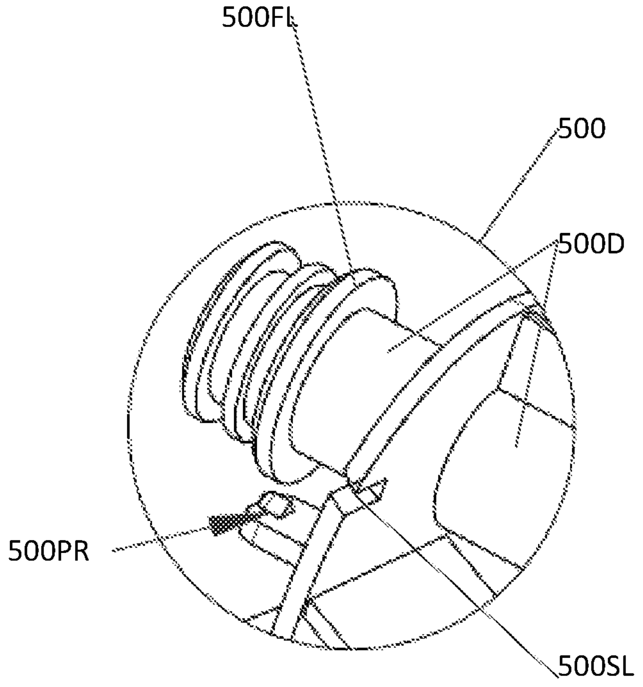
Figure 15:
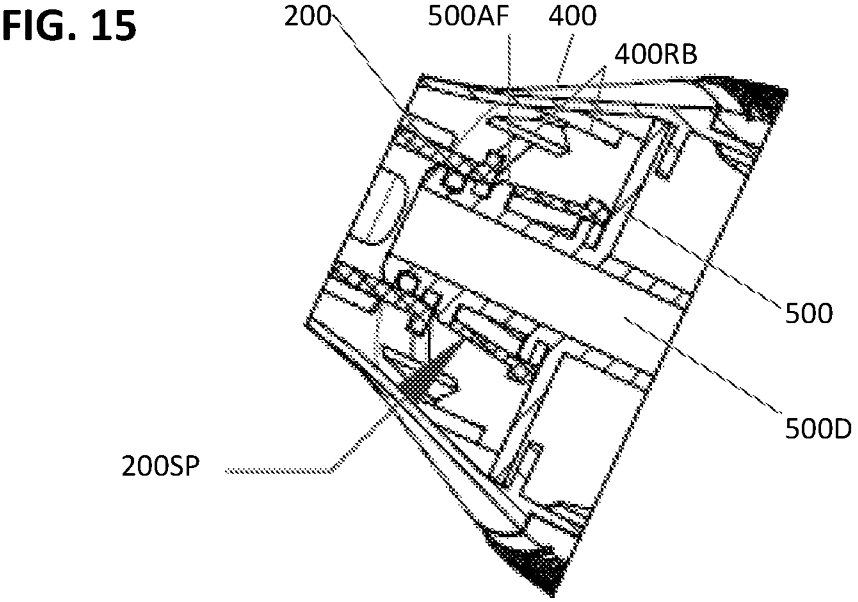
Figure 16:
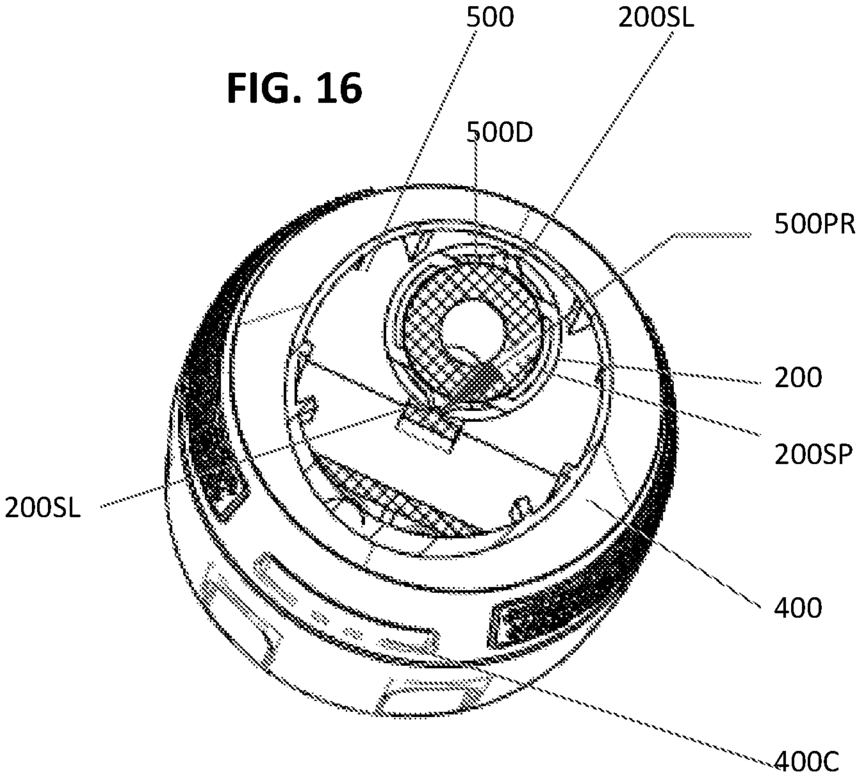
Figure 17:
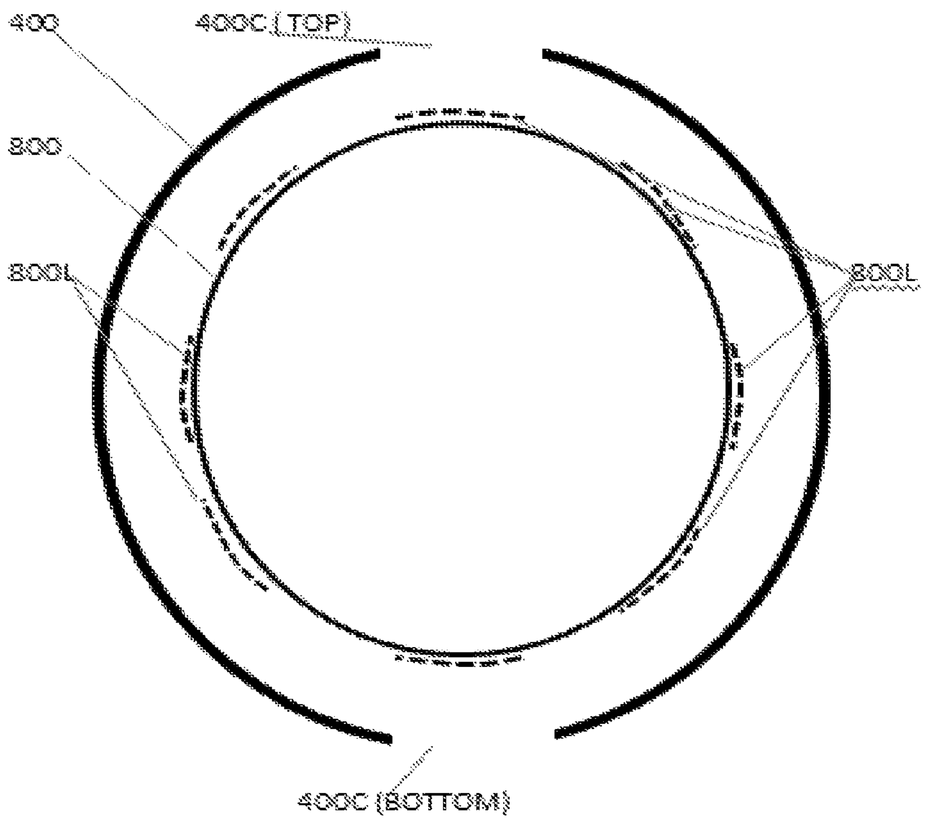
Figure 18:
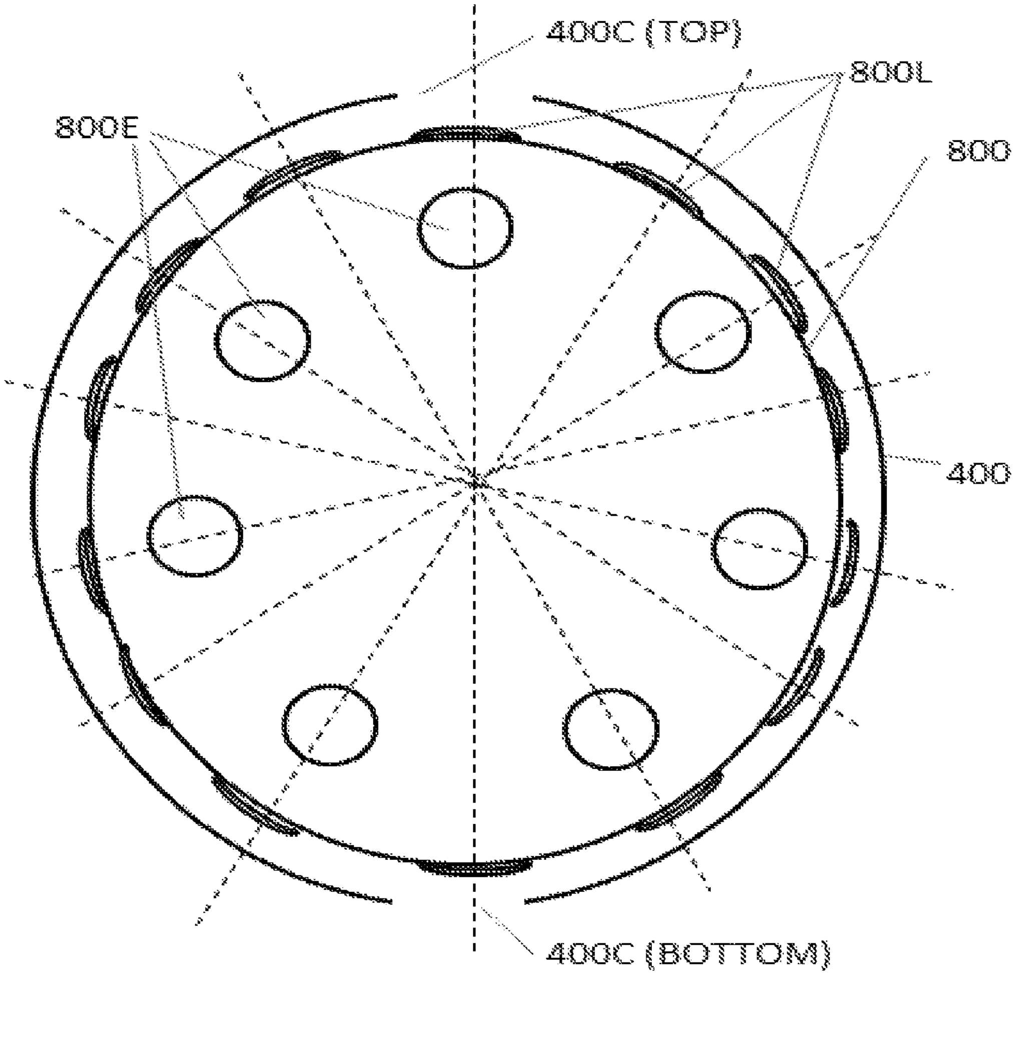
Figure 19:
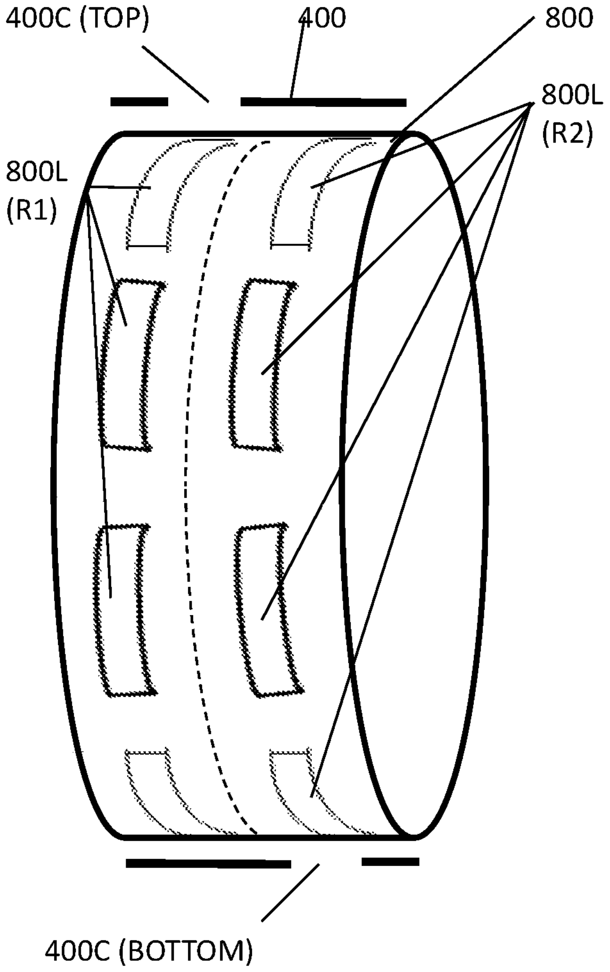

9D-9H showing top, right side, bottom and left side views, respectively, of the assembled spray device in an angular position;

FIGS. 10A and 10B are schematic diagrams showing illustrative positioning and orientation of the spraying device within a user's hand during normal operation and use in the preferred embodiments;

FIGS. 11A to 18 show other embodiments of the present invention, wherein:

FIG. 11A is an exploded perspective view showing components of a spray device in another illustrative embodiment of the invention with the components oriented to demonstrate a straight configuration of the spray device;

FIG. 11B is a perspective view of the spray device shown in FIG. 11A with the components assembled together and oriented in a straight configuration;

FIG. 12A is an exploded perspective view showing components of the spray device shown in FIG. 11A with the components oriented to demonstrate an angled configuration of the spray device;

FIG. 12B is a perspective view of the spray device shown in FIG. 12A with the components assembled together and oriented in an angled configuration;

FIG. 13 is an explanatory perspective view of a tube member (200) of the spray device shown in FIGS. 11A-12B;

FIG. 14 is an explanatory perspective view of a portion of directing attachment member (500) of the spray device shown in FIGS. 11A-12B;

FIG. 15 is a cross-sectional side view (along a central axis of the spray device) showing components of the spray device shown in FIGS. 11A-12B that are internal to a surrounding sleeve (400) when in an assembled state;

FIG. 16 is a rear cross-sectional view (transverse to the central axis of the spray device) showing components of the spray device shown in FIGS. 11A-12B that are internal to a surrounding sleeve (400) when in an assembled state; and FIGS. 17-19 are schematic diagrams showing illustrative relationships between labels representing spray settings and window position according to some illustrative embodiments.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

This technology pertains generally to a hand-held spray device (e.g., spray gun) for attachment to the end of a water supply (e.g., a flexible hose connected to a public utility water supply water) for dispensing water for various purposes, such as, e.g., for watering landscaping and vegetation (e.g., lawns, plants, gardens, etc.), cleaning objects or surfaces (e.g., buildings, patios, decks, cars, etc.) and other uses.

The preferred embodiments of the present invention provide a novel angular adjustment mechanism that enables the spray device to be changed between a first straight configuration (e.g., in which water is sprayed substantially linearly along a substantially straight line through the device and through the discharge outlet similar to a common fireman's hose) and a second angled configuration (e.g., in which water is directed at an angle by the spray device to discharge water at an angle similar to a common hand-held spray gun).

In some preferred embodiments, the spray device includes two axially-aligned tubular members (i.e., a base member and a nozzle-containing member) that are mounted together in a manner to rotate relative to one another in an end-to-end relationship. In the preferred embodiment, the contact surface between both axially-aligned tubular members is at an angle other than 90 degrees from the center axes of the tubular members. Accordingly, upon relative rotation of the tube members, the tubular members are movable between a substantially straight position to an angled position. In the preferred embodiments, movement between these two positions involves a complete 180 degree rotation of the nozzle-containing member relative to the base member.

The preferred embodiments include a number of novel and advantageous features that enhance operation and usability of the device when the nozzle-containing member is rotated relative to the base member. In particular, such a rotation (which is, e.g., 180 degrees of rotation in some preferred embodiments) of the nozzle-containing member impacts the orientation of the device within a user's hand during normal operation and use. In the context of this changed orientation of the nozzle-containing member, some of the more preferred embodiments of the present provide novel and advantageous features that achieve one or more of the following advantageous results:

1) In some embodiments, the positional location of discharge from the end face of the nozzle head is maintained despite a change in angular orientation of the nozzle-containing member. In particular, the discharge from the nozzle-containing member is preferably consistently directed from a common positional location from the end face of the nozzle head (e.g., in preferred embodiments, from a top side—e.g., from a 12 o'clock position—of the nozzle head) despite a changed orientation of the nozzle-containing member when angularly adjusted.
2) In some embodiments, the type of discharge from the end face of the nozzle head is maintained despite a change in angular orientation of the nozzle-containing member. In particular, the discharge from the nozzle-containing member is preferably consistently directed through a like type outlet in the end face of the nozzle head (e.g., to impart a like type of discharge) despite a changed orientation of the nozzle-containing member when angularly adjusted.
3) In some embodiments, the orientation of a display (such as, e.g., a display window) designating the type of discharge from the end face of the nozzle head is maintained despite a change in angular orientation of the nozzle-containing member. For example, in some embodiments, a display designating the type of discharge from the end face of the nozzle head is located at a top side of the nozzle-containing member to facilitate viewing by a user when held by hand during normal use of the device despite a changed orientation of the nozzle-containing member when angularly adjusted.

Illustrative Embodiments

The following paragraphs describe in detail illustrative embodiments of the present invention shown in the accompanying figures.

a. First Illustrative Embodiments

Towards that end, FIGS. 1-6E show first illustrative embodiments of the invention, FIGS. 7A-8E show a second illustrative embodiments of the invention, and FIGS. 9A-9H show a third illustrative embodiment of the invention. FIGS. 10A and 10B are explanatory diagrams showing illustrative positioning and orientation of a spraying device according to each these three illustrative embodiments held by a user within the user's hand during normal operation and use in the preferred embodiments.

Towards that end, as shown in FIG. 10A, in normal use of the spraying device 100, in some illustrative embodiments, the spraying device 100 is attached at the end of a conduit or hose H, such as, e.g., a common flexible garden hose having an elongated flexible body portion (e.g., made of a flexible rubber or synthetic material) and rigid end portions (e.g., made of metal, hard plastic or the like) having threads that can be threaded into the base of the spraying device. When held in the hand of a user U, as shown, the user generally holds the hose along the user's body below eye level as shown in FIG. 10.

Figure 5A:
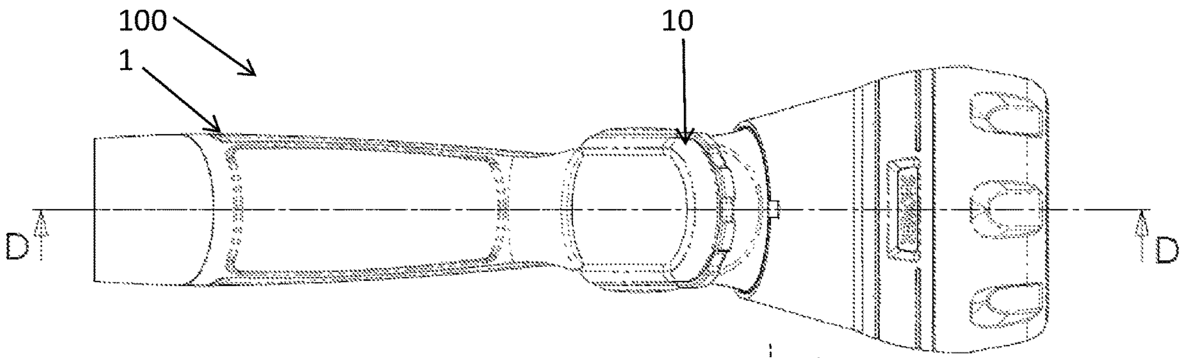
Figure 5B:
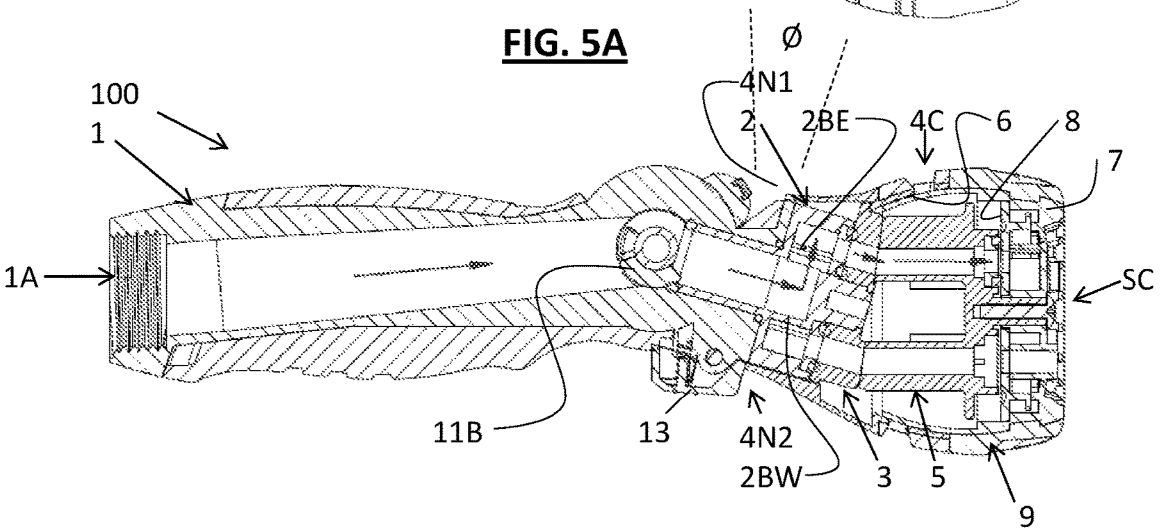
Figure 5C:
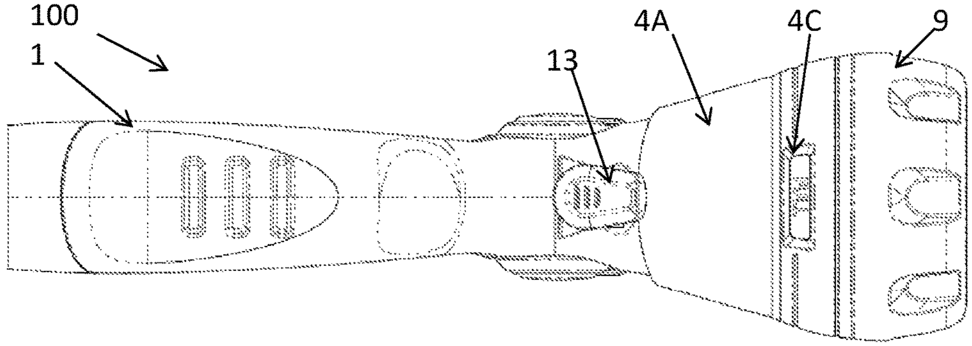
Figure 5D:
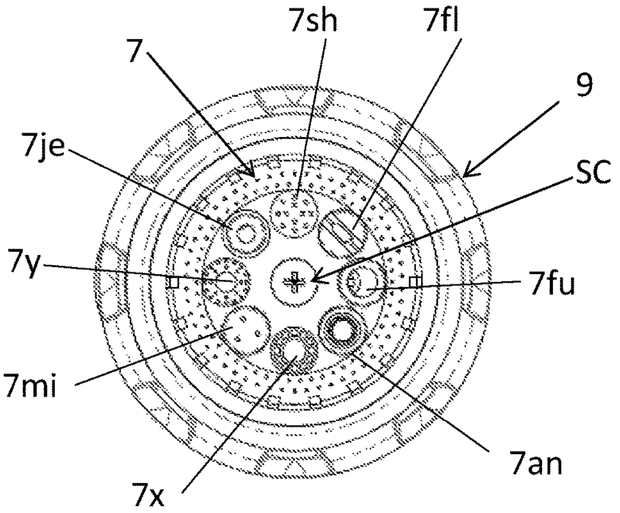
Figure 5E:
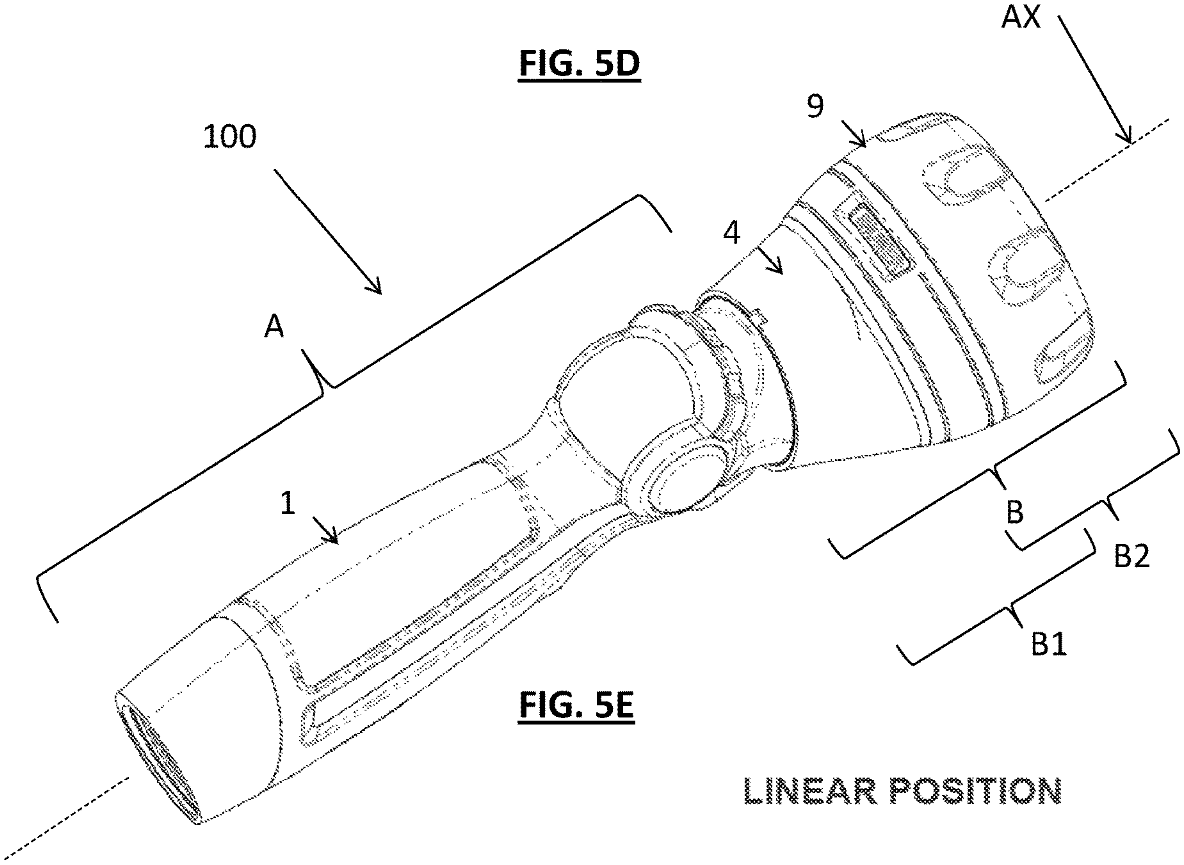

As shown in FIG. 5E, which is a perspective top view of the spray device 100 according to the first embodiment of the invention, the spray device 100 has base section A and a head section B. The head section B is axially aligned with the base section A along the axis AX and is mounted such as to be axially rotatable with respect to the base section A around the axis AX. As discussed below, this relative rotation of the head section B results in changing of the angular position of the head section B with respect to the base section A.

In addition to the relative movement between the base section A and the head section B, the head section B also includes a front sub-section B2 that is relatively movable with respect to the attaching sub-section B1 of the head section. This relative movement enables a user to alter the relative positions of the front sub-section B2 with respect to the attaching sub-section B1 to alter a type of spray selected (as discussed further below).

In operation, the user U can, thus, grasp the base section A in one hand, and the head section B in the other hand and relatively rotate the sections around the axis AX to select a desired angular position. Additionally, the user U can manually rotate the front sub-section B2 with respect to the attaching sub-section B1 in order to select a desired spray type. Notably, as discussed below, the attaching sub-section B1 is lockable to the base section A, facilitating manual rotation of the front sub-section B2 even with one hand while holding the base section A with the other hand. As discussed further below, the front sub-section B2 includes an indicia ring portion 6 that extends underneath a portion of the sleeve 4 such that a discharge selection identification that is located on the indicia ring is visible through the display window 4C discussed below.

Components of the first illustrative embodiment shown in FIGS. 1-6E will now be described in further detail. As shown in exploded view in FIG. 1A, the spray device 100 includes a base handle 1 that is configured to be manually grasped by a user (such as, e.g., shown in the illustrative examples in FIGS. 10A and 10B). The base handle 1 is tubular in configuration and includes a passageway extending through its length from an inlet 1A to an outlet 1E. As shown in, e.g., FIGS. 1A and 2, the inlet 1A preferably includes internal threads for threadingly engaging the discharge end of a common hose H or the like as shown in FIGS. 10A and 10B. When grasped by a user U in a normal single hand use position as shown in FIGS. 10A and 10B, the user's palm extends over a top side of the hand region 1B, the user's four digit fingers extend around the hand region 1B and under the bottom of the hand region, and the user's thumb extends proximate the thumb lever 10.

Figure 2:
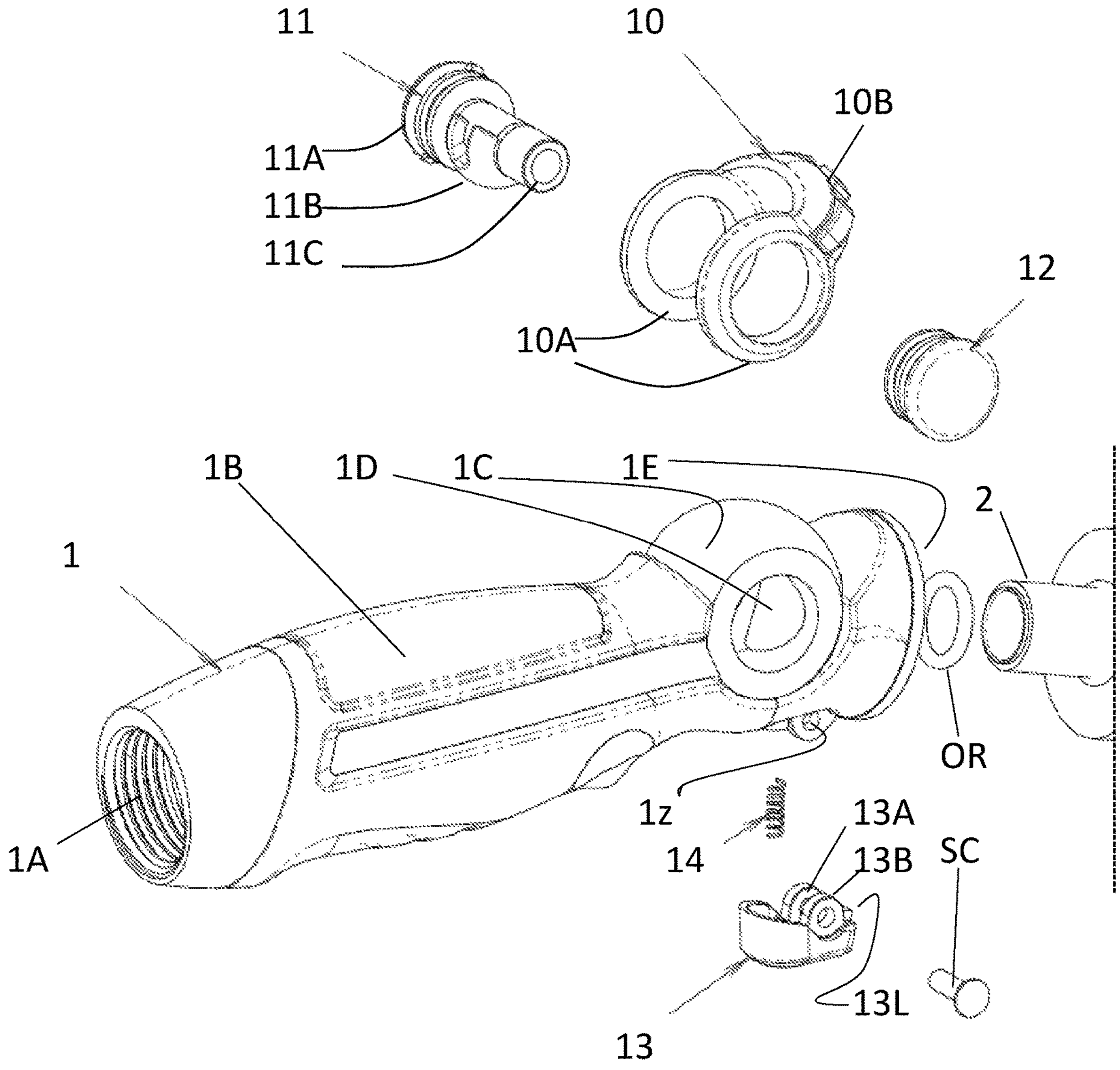
FIG. 2 is an enlarged view of the left side portion of the exploded perspective view shown in FIG. 1A.

As shown in, e.g., FIG. 2, the thumb lever 10 includes a substantially U-shaped lever arm and two mounting rings 10A. The thumb lever is mounted so as to straddle the thumb section 1C of the base handle 1 as shown in, e.g., FIG. 5E. A valve member 11 is fixed to the lever arm by fixedly engaging a cap portion 11A to one of the mounting rings 10A, and a shaft 11C extends through a cross-passageway 1D extending entirely laterally through the handle 1. The distal end of the shaft 11C is attached to a cap member 12 that is fixedly mounted to the other mounting ring 10A. The shaft 11C supports a valve disc 11B that is sized and shaped to occlude the passageway in the handle at a particular orientation and to not occlude the passageway at another orientation. In use, the lever arm 10 is fixed to the valve member, while movable as a unit on the thumb section 1C of the base handle 1. In this manner, a user U can simply push the lever with the user's thumb or the like to open or close the flow of water via the spray device 100 by movement of the valve disc 11B between fully closed (i.e., occluded) and fully opened positions.

Figure 3A:
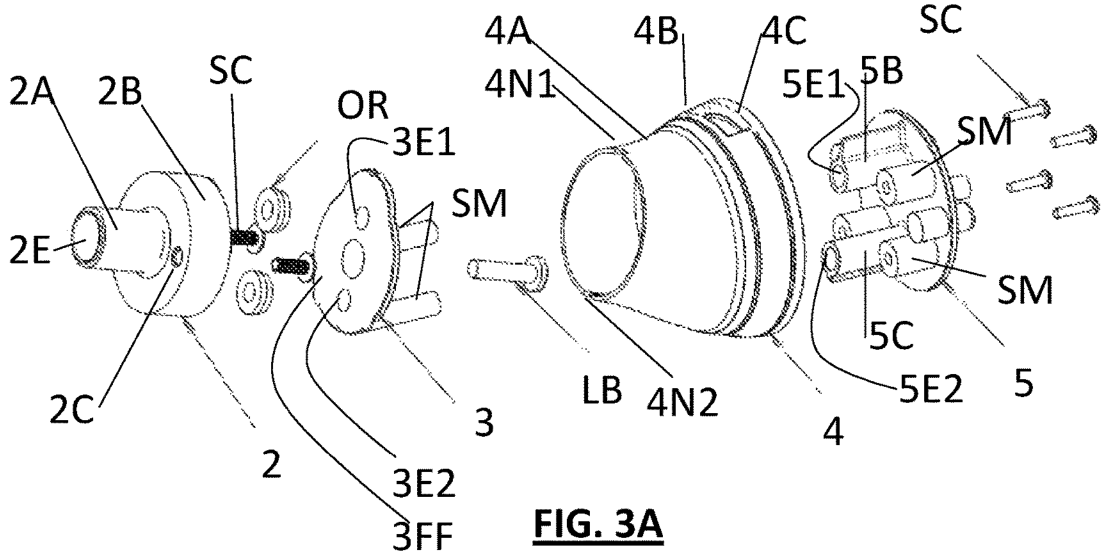
FIG. 3A is an enlarged view of the middle portion of the exploded perspective view shown in FIG. 1A.

As shown in FIG. 2, a diverter member 2 is fixedly mounted at the discharge outlet 1E of the base handle 1. As shown in FIG. 3A, the diverter member 2 includes an insertion tube section 2A that is configured to be received within the outlet 1E and a diverter cup section 2B having holes 2C for receiving mounting screws SC as illustrated. During assembly, a sealing ring (e.g., an o-ring) OR is inserted into the outlet and the tube section 2A is fully inserted into the outlet 1E to a position as shown in, e.g., FIG. 5B. Then, the mounting screws are used to fixedly attach the diverter member 2 to the end of the base handle 1.

Figure 3B:
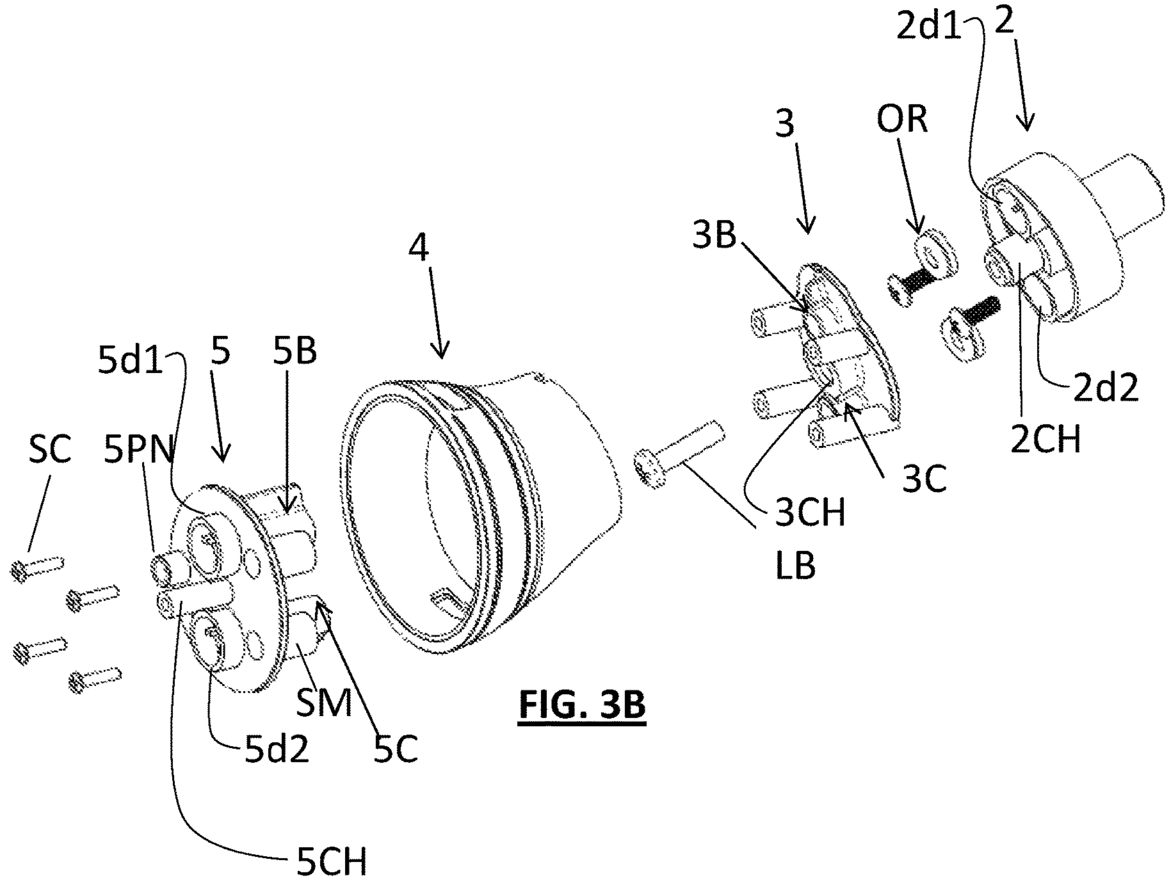
FIG. 3B is an enlarged view of the middle portion of the exploded perspective view shown in FIG. 1B.

The tube section 2A of the diverter member 2 operates to receive water from the outlet 1E of the base handle 1. As shown in FIGS. 3B and 5B, the diverter cup section 2B includes a central protrusion 2CH that is providing for mounting purposes (as discussed below), and at least one radially-stepped tubular conduit (see, e.g., 2*d*1 and 2*d*2) that is in fluid communication with the tube section 2A. In the embodiment shown in FIGS. 1-6C, the tubular conduit 2*d*1 is in fluid communication with the insertion tube section 2A via flow opening 2BE shown in FIG. 5B, while the tubular conduit 2*d*2 is blocked from fluid communication by the occluding wall 2BW.

In some alternative embodiments, the tubular conduit 2*d*2 could be entirely eliminated, such that there is only one radially-stepped tubular conduit 2*d*1. Alternatively, such as shown in the second embodiment shown in FIGS. 7A-8E (discussed further below), in other embodiments both the tubular conduit 2*d*1 and the tubular conduit 2*d*2 can be in fluid communication with the tube section 2A.

Figure 1A:
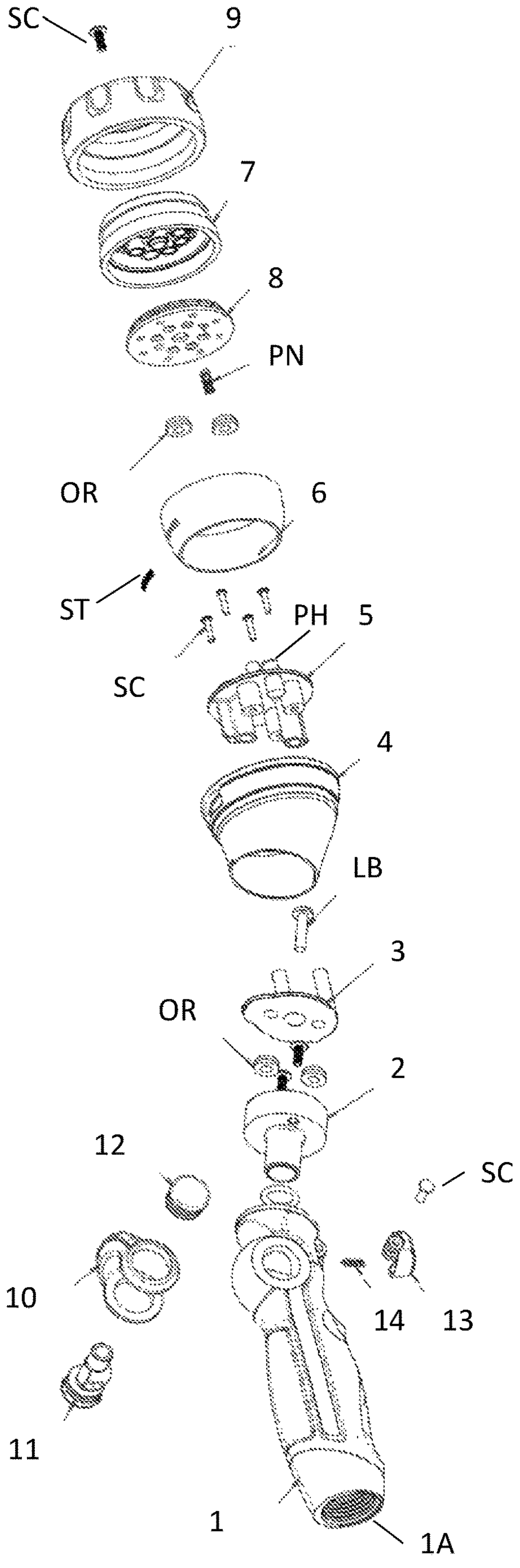
FIG. 1A is an exploded perspective view showing components of a spray device in some first illustrative embodiments of the invention from a base end of the device.
Figure 1B:
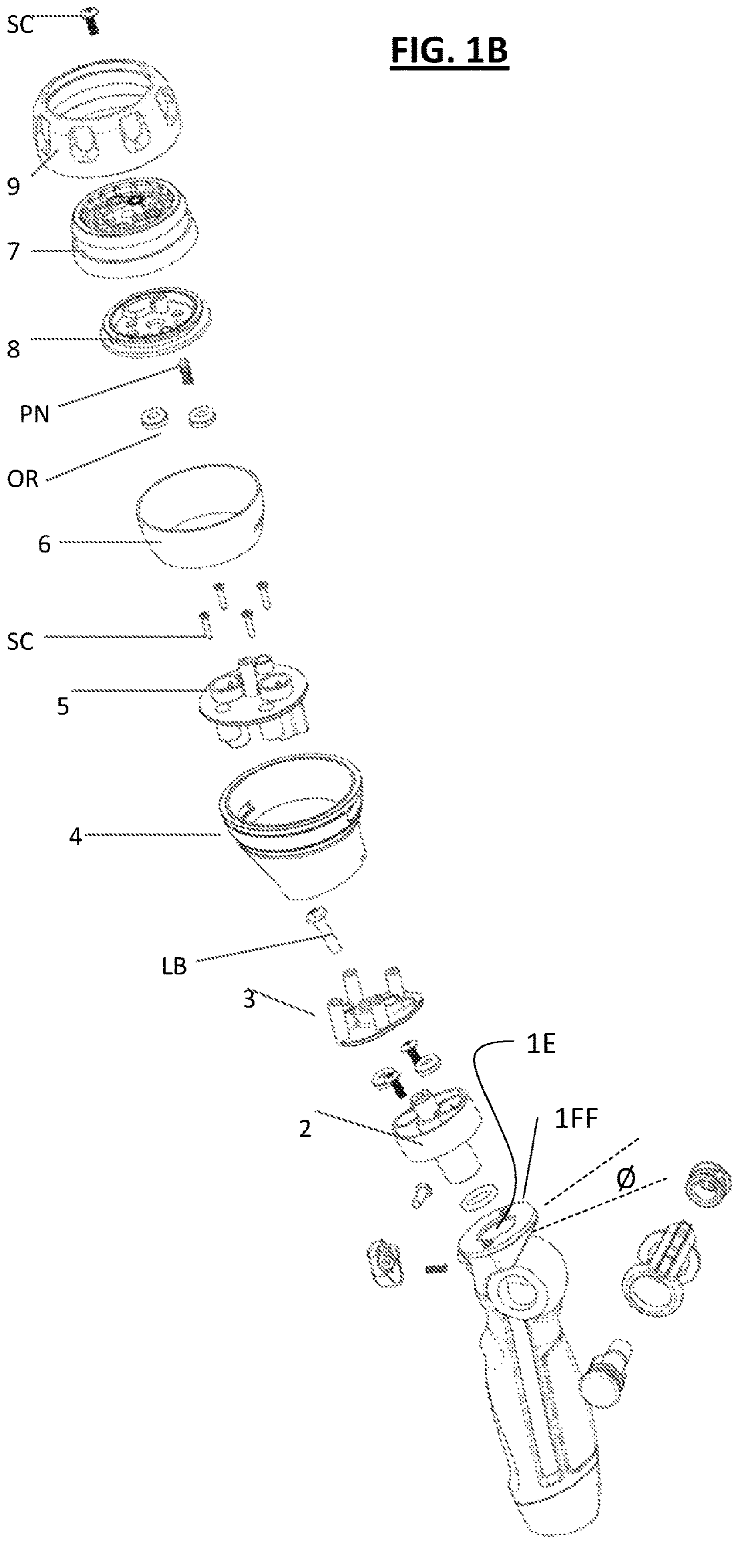
FIG. 1B is an exploded perspective view showing components of the spray device shown in FIG. 1A from a head end of the device.

As shown in FIGS. 1B and 5B, the front face 1FF of the base handle 1 is a planar surface set at an acute angle ø with respect to a line perpendicular to the center axis AX of the base handle 1. Similarly, when fixedly mounted to the base handle 1, the front end of the diverter cup section 2B is also at a similar angle ø and extends along a plane that is parallel to the front face 1FF of the base handle.

Together, the base handle 1 and the diverter 2 constitute part of the base section A described above, around which base section the head section B is relatively rotated.

As shown in, e.g., FIG. 3B, a first component of the head section B that is rotatably connected to the base section A is a multi-channel cap 3 that is rotatably mounted to the diverter member 2. As shown in, e.g., FIG. 3A, the multi-channel cap 3 includes a generally circular plate member having a flat face 3FF that is configured to rest along the plane of the front of the diverter cup 2B of the diverter member 2.

As shown, the multi-channel cap 3 includes two channels 3B and 3C that are located 180 degrees apart from one another around a center of the cap 3. In order to rotatably mount the cap 3 upon the diverter member 2, a forwardly projecting cup 3CH of the cap 3 is fitted over the central protrusion 2CH of the diverter member 2, and a locking bolt LB is inserted through a through-hole in the center of the projecting cup 3CH and screwed into a threaded central hole at the center of the central protrusion as shown in, e.g., FIG. 3B. When inserted, the head portion of the locking bolt LB extends across a larger diameter than the diameter of the through-hole in the center of the projecting cup 3CH such that the multi-path cap 3 is retained on the diverter member 2. However, the locking bolt LB is not tightly affixed to the cap 3, but attached with minimal or no pressure applied to the cap 3 by the bolt LB such that the cap can freely rotate beneath the locking bolt LB. In this manner, the cap 3 can be rotatable fixed to the diverter member 2. Note that while the locking bolt LB is omitted from FIG. 5B for illustrative purposes, when assembled the locking bolt LB would be visible within the cross-sectional view shown in FIG. 5B (and would also be visible in cross-sectional views such as, e.g., in FIGS. 6B, 7B and 8B discussed infra).

However, prior to attaching the multi-path cap 3 to the diverter member 2, sealing members (e.g., o-rings) OR are preferably inserted between the at least one tubular conduit 2*d*1, 2*d*2 and the flat face 3FF of the cap 3. As best seen in, e.g., FIG. 5B, the at least one conduit 2*d*1, 2*d*2 preferably includes a stepped front edge that is configured to receive such a sealing member or o-ring OR. In this manner, when the cap 3 can be rotated relative to the diverter member 2 such as to align different channels (e.g., flow paths) from a plurality of flow channels in the cap 3 with the at least one tubular conduit 2*d*1, 2*d*2 of the diverter member 2. In particular, in the embodiment shown in FIGS. 1-6E, as indicated above, the cap 3 includes two channels 3B and 3C that are located 180 degrees apart from one another around a center of the cap 3.

As shown in, e.g., FIG. 3B, the cap 3 also includes a plurality (e.g., four in the illustrated example) of screw mounting projections extending forwardly on a side opposite to the diverter member 2. These mounting projections are used to fixedly attach a re-directing attachment 5 to the cap. In short, the re-direct attachment 5 includes a plurality of channels 5B and 5C that are aligned with the channels 3B and 3C of the cap when the re-direct attachment 5 is fixedly attached to the cap 3. In this manner, the direction of the channels 3B and 3C is redirected such that water flows in an angled path through the combined cap and re-direct attachment 5. Although the cap 3 and the re-direct attachment 5 could be formed as a single member in some embodiments, due to complexities in fabrication of such a unitary combined structure, the cap 3 and re-direct attachment are preferably fixed together as shown. In the illustrated embodiment, the rear side of the re-direct attachment preferably includes screw mounting portions SM that are essentially straight tubes that are sized to fit over the screw mounting portions extending from the front side of the cap 3. To fix the members together, mounting screws (see, e.g., the four mounting screws SC at the left side of FIG. 3B) are inserted through the mounted portions SM of the re-direct attachment 5 and screwed into threaded holes in the ends of the screw mounting portions of the cap 3. The heads of the screws SC are sized such as to abut a surface of the re-direct attachment 5 to fix it securely to the cap 3.

As shown in, e.g., FIGS. 3B and 5B, the combined cap 3 and re-direct attachment 5 are preferably located inside of a surrounding sleeve member 4. The sleeve member 4 is fixedly attached to the combined cap 3 and re-direct attachment 5, such as, e.g. via adhesive, welding and/or mechanical connection (e.g., employing other screws or bolts). When assembled, the combined cap 3, re-direct attachment 5 and sleeve form the attaching sub-section B1 of the head section B shown in FIG. 5E.

As shown in, e.g., FIGS. 2 and 5B, the sleeve portion 4 (which is fixedly attached to the cap 2 and re-direct attachment 3 as discussed above) can be locked in position with respect to the base handle via the lock 13. In this regard, the lock 13 preferably includes an index-finger trigger member 13 that is pivotably supported by two support rings 13A and 13B that are located so as to straddle a depending protrusion in the base handle 1 having a lateral through hole 1*z* through which a support pin or screw SC is inserted and fixed at the other end with a bolt or the like. In this manner, the trigger is pivotably mounted to pivot around the support pin or screw SC. At the forward side of the support pin or screw is a latch projection 13L and at a rearward side of the support pin or screw is a spring 14 which biases the trigger downward such as to bias the latch projection 13L upward.

As shown in FIG. 3A, the sleeve 4 includes two cut-out recesses 4N1 and 4N2 located 180 degrees on opposite sides from one another. These recesses are sized and positioned such as to receive the locking projection 13L of the lock 13 when the sleeve is oriented around the axis AX (see FIG. 5E) with a respective recess aligned with the locking projection. In this manner, when the locking projection is located within one of the recesses 4N1 or 4N2, the sleeve 4 is prevented from rotation around the axis AX with respect to the base handle 1. Accordingly, the device can readily be retained in a desired angular orientation due to the operation of the lock 13. In order to change the angular orientation of the sleeve 4 with respect to the base handle 1, a user U can simply pull the trigger 13 (e.g., with the user's index finger) to raise the locking projection out of the corresponding recess 4N1 or 4N2 such that the sleeve can be rotated. Notably, once the locking projection is removed from the corresponding recess and the sleeve is rotated slightly, the trigger 13 can preferably be released and the projection will, thus, slide on the exterior of the sleeve as the sleeve is rotated relative to the base handle 1 until the locking projection reaches one of the recesses 4N1 and 4N2 and is caused to enter the recess due to the force of the spring 14 such as to again lock the relative position of the sleeve 4 with respect to the base handle 1.

As indicated above, the sleeve 4 also includes at least one window 4C in order to display a selected type of spray (as discussed further below).

As discussed above, the head section B shown in FIG. 5E also includes a front sub-section B2 that is further rotatable relative to the attaching sub-section B1 in order to select desired spray types (as discussed below). More particularly, the front sub-section B2 includes, as shown in, e.g., FIGS. 1A, 4A and 4B, the following components that are fixedly attached to one another: a front grommet ring 9 that includes finger-gripping recesses 9B to facilitate manual rotation by a user a turret member 7 that is fixed inside the grommet ring 9 that has a plurality of selectable spray type port configurations, a turret cap 8 that is fixed to the turret to facilitate fluid flow into the turret, and an indicia ring 6 that is fixed to the perimeter of the turret 7 and includes indicia around the periphery thereof that is viewable through the window 4C of the sleeve upon selection of a particular angular position between the front sub-section B2 and the attaching sub-section B1.

As shown in the front view of FIG. 5D, the turret 7 includes a plurality of spray type port configurations. In particular, in the illustrative example, the turret includes eight illustrative selectable spray type port configurations. Specifically, each selectable spray type configuration involves a particular shape of a discharge outlet that causes water flowing there-through to take on a particular shape or characteristic. In the illustrated example shown in FIG. 5D, the turret is shown to include the following illustrative and non-limiting examples of spray types: (1) a shower port configuration 7*sh* which includes an array of holes as shown configured to discharge water in droplets/streams from a plurality of locations in a manner similar to a common house-hold showerhead; (2) a flat or planar port configuration 7*fl* that includes a narrow and wider slot as shown to create a wide and flat discharge; (3) a full port configuration 7*fu* which includes a large opening for dispensing a larger volume of water, (4) a mist port configuration 7*mi* which includes a few small holes that are sized to create a mist water discharge; (5) an annular port configuration Tan that includes a ring shaped or annular discharge outlet configured to discharge water in an annular or cone-like manner; (6) a jet port configuration 7*j* e that includes a smaller discharge outlet adapted to provide a high-power narrow discharge; (7) another modified port configuration as shown at 7*y*; and (8) another modified configuration as shown at 7*x*.

Figure 4A:
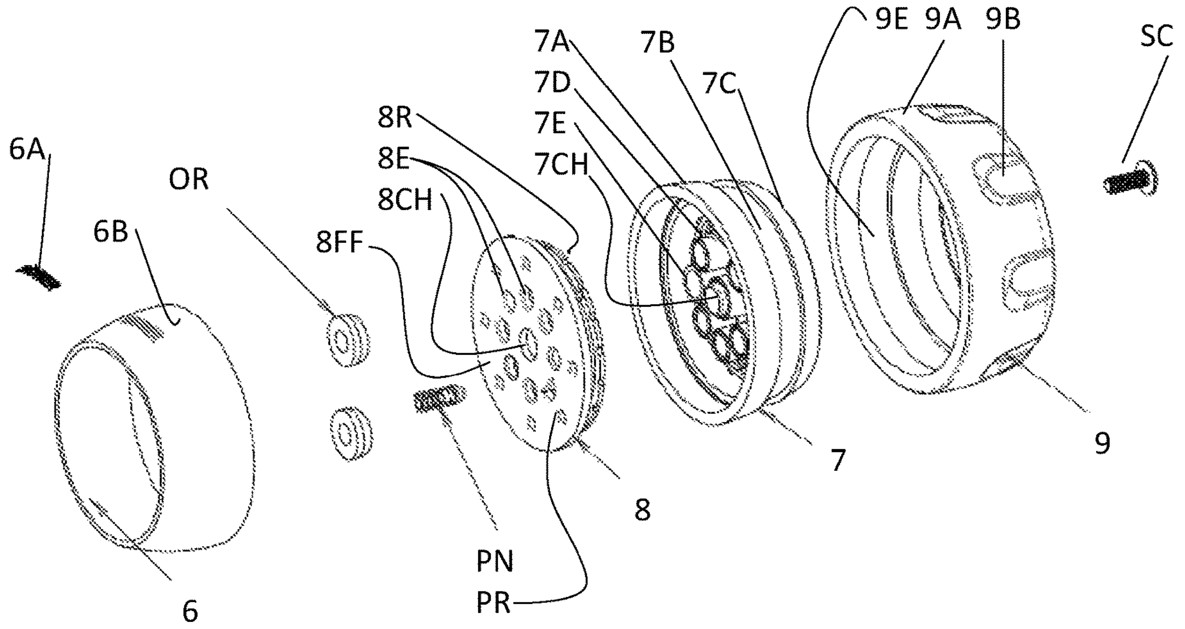
FIG. 4A is an enlarged view of the head side portion of the exploded perspective view shown in FIG. 1A.

As shown in FIG. 4A, the rear side of the turret 7 includes eight tubular conduits 7D each having through passages 7E that lead to respective ones of said selectable spray type configurations. In use, a particular spray type is selected by a user by manually rotating the grommet ring 9 in relation to the position of the re-direct attachment 5 (discussed above) such as to align a desired spray type port with respect to the discharge from the re-direct attachment (as discussed further below).

As shown in, e.g., FIG. 3B, the front side of the re-direct attachment 5 (i.e., opposite to the cap 3) includes conduits 5*d*1 and 5*d*2 that each are axially aligned with the respective channels 5B and 5C as shown. The conduits 5*d*1 and 5*d*2 have a wider diameter than the channels 5B and 5C, as shown in FIG. 5B such as to receive the seal members or o-rings OR which are depicted in, e.g., FIGS. 4A and 4B. As should be appreciated, the seal members or o-rings OR are configured to extend past the ends of the conduits 5*d*1 and 5*d*2 such as to sealingly slide along and engage the flat face 8FF of the turret cap 8.

As also shown in FIG. 3B, the re-direct attachment also include a mounting holder 5PN for supporting a spring biased pin or projection PN shown in, e.g., FIG. 4A in such a manner that a tip end of the spring biased projection is received within a corresponding recess PR when the front sub-section B2 and the attaching sub-section B1 are aligned such that the discharge paths are appropriately aligned. Preferably, the tip end of the pin or projection PN is curved such that the pin or projection PN will exit the respective recess PR upon the application of a rotational force. However, the device is preferably constructed such that the pin or projection PN creates some tactile resistance when rotating so as to remove the pin or projection from a recess and/or an audible clicking sound or sensation when rotating such that the pin or projection falls within such a recess.

Figure 4B:
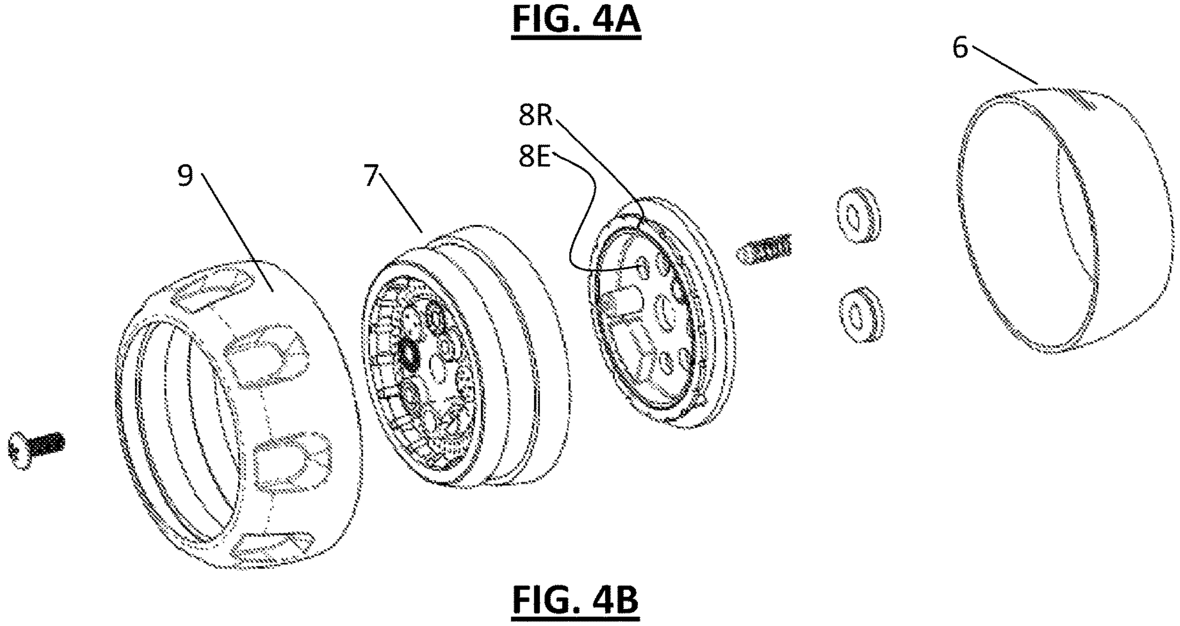
FIG. 4B is an enlarged view of the head side portion of the exploded perspective view shown in FIG. 1B.

As shown in FIGS. 4A and 4B, the turret cap 8 includes a plurality of through holes 8E which are alignable with the conduits 5*d*1 and 5*d*2 such as to be in fluid communication therewith. As shown in FIG. 4B, the front side of the turret cap 8 which faces the turret 7 when mounted thereto can include other structure in some embodiments to affect flow through a respective through hole 8E.

As also shown in FIGS. 4A and 4B, the perimeter of the turret 7 preferably includes wider rear-end collar 7A, a narrower mid-section 7B and a widened front end 7C. In this manner, the grommet ring 9 can be securely retained on the turret. For example, the grommet ring can, e.g., in some embodiments, be made with a rubber or other flexible material that is resiliently stretched and retained on the turret. The grommet ring 9 can alternatively be attached to the turret in a variety of other ways, such as, e.g., via adhesive, welding and/or mechanical means such as, e.g., screws or the like. Moreover, the grommet ring 9 can alternatively be made with a more rigid material such as, e.g., a plastic and/or metal material. Similarly, various parts such as, e.g., the base handle 1, the diverter member 2, the cap 3, the sleeve 4, the re-directing attachment 5, the indicia ring 6, the turret 7, and the turret cap 8 can also be made with a variety of materials, such as, e.g., with rigid plastic materials and/or metal materials. On the other than, the sealing members or o-rings OR are preferably made with flexible materials such as, e.g., rubber, plastic or other synthetic flexible materials suitable for sealing purposes as is known in the art.

As also shown in FIG. 4A, the turret 7 also preferably includes a center projection 7CH having a screw-receiving through-hole that is also aligned with a center screw receiving through-hole 8CH in the turret cap 8. As shown in FIGS. 4A and 5B, the center projection 7CH preferably includes an indented ridge around the distal end of the center projection that forms a smaller diameter tip portion that is snuggly received within the through-hole 8CH in the turret cap 8.

As shown in FIGS. 4A and 5B, the front sub-section B2 is preferably attached to the attaching sub-section B1 by inserting a screw SC into the center projection 7CH such that a head of the screw abuts a ridge surrounding the through-hole within the center projection 7CH and the shaft of the screw SC extends through the turret cap through-hole 8CH and is screwed into a center projecting screw boss 5CH extending from a front side of the re-directing attachment 5 as shown in FIG. 3B. Similarly to the locking bolt LB described above, this latter screw SC is not tightly affixed to the turret 7, but attached with minimal or no pressure applied to the turret 7 by the screw SC such that the turret can freely rotate beneath the screw SC. In this manner, the turret 7 can be rotatable fixed to the re-directing attachment 5. Notably, the turret 7, turret cap 8, indicia ring and grommet ring 9 are preferably fixedly connected together such as to form a unitary turret assembly that is rotatable relative to the sleeve 4 for angular adjustment of the turret 7 for selection of a desired spray type. Although these elements of the turret assembly are connected together, in some embodiments, a plurality of these separate elements can be integrally formed together.

With respect to the indicia ring 6, as shown in FIGS. 1A and 4A, in some embodiments the indicia ring 6 can include stickers or labels 6A that are adhered to the perimeter of the ring at locations corresponding to respective spray types of the aligned turret. Towards that end, in the illustrated embodiment in FIGS. 1-6E, as eight spray types are included, the indicia ring 6 can include eight corresponding stickers or labels 6A around the periphery thereof. Alternatively, such indicia can be formed in any desired manner upon the periphery of the indicia ring 6. In some preferred embodiments, the indicia would include short one-word descriptions, such as, e.g., "full" or "shower." In other embodiments, indicia can alternatively or additionally include symbols, numbers, pictures or other forms of indicia identifying the spray type.

Accordingly, as set forth above, the spray device 100 of the first embodiment includes two axially-aligned tubular members (i.e., a base section A and a head section B) that are mounted together in a manner to rotate relative to one another in an end-to-end relationship. In the preferred embodiment, the contact surface between both axially-aligned tubular members is at an angle ø (shown, e.g., in FIG. 5B) that is non-perpendicular to the center axes of the tubular members. Accordingly, upon relative rotation of the tube members, the tubular members are movable between a substantially straight position to an angled position as schematically shown in FIGS. 10A and 10B. In the embodiment shown in FIGS. 1-6C, movement between these two positions involves a complete 180 degree rotation of head section B with respect to the base section A.

Figure 6A:
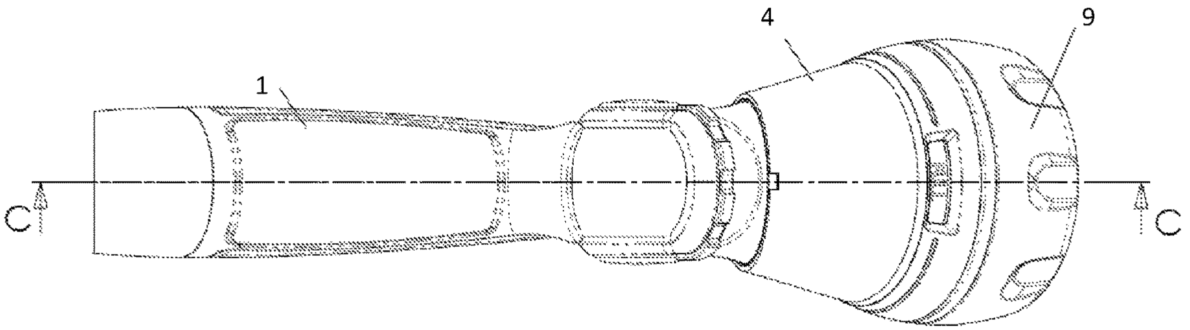
Figure 6B:
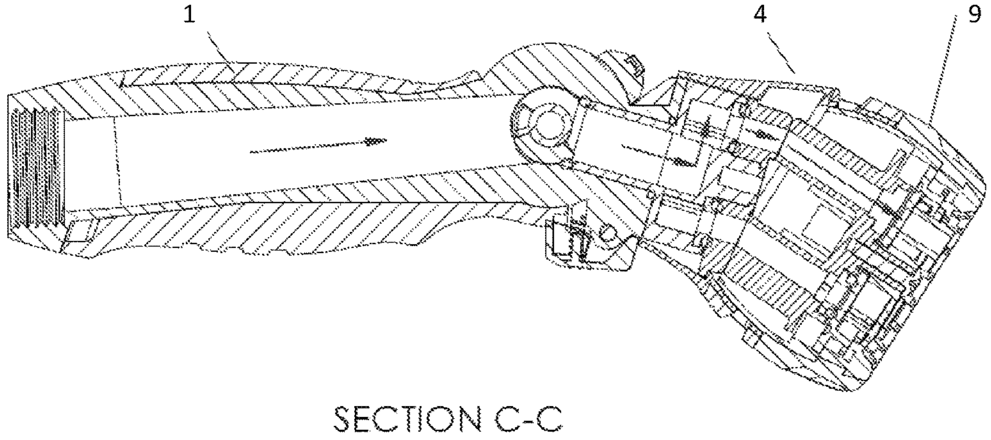
Figure 6C:
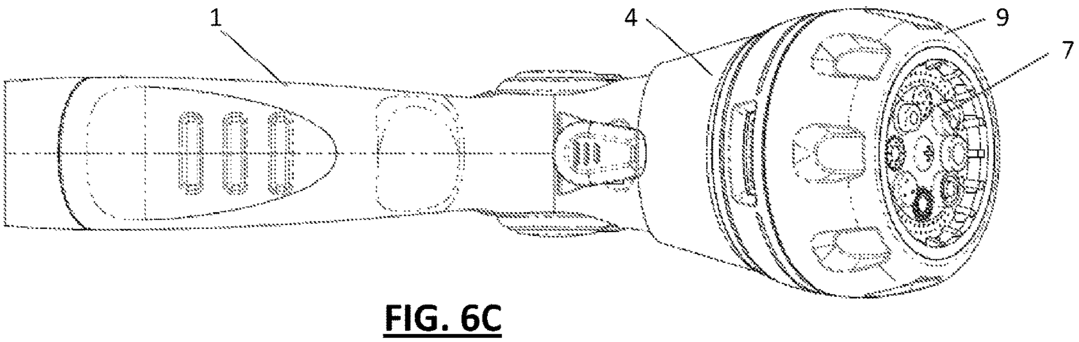
Figure 6D:
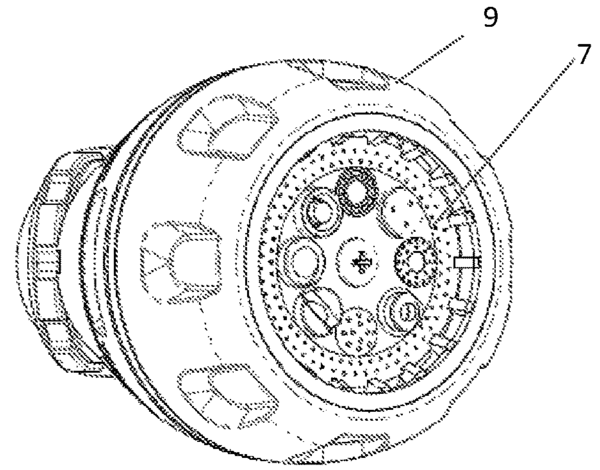
Figure 6E:
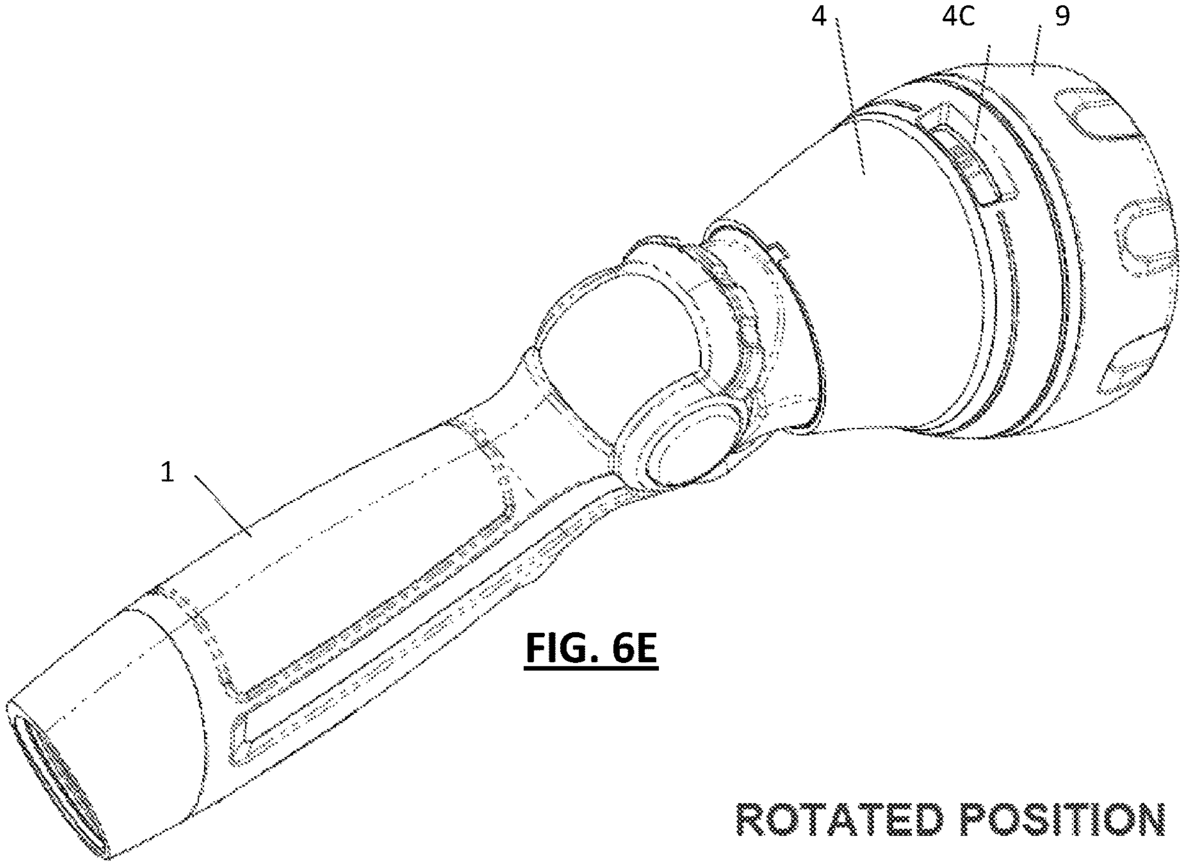

In the above description of the first embodiment, reference has been made substantially so far to the spray device 100 as oriented in a linear position. Here, the terminology linear position does not require an absolute straight line, but involves and orientation that is substantially straighter than a second orientation that is achieved upon rotation of the head section B relative to the base section A As indicated above, FIGS. 6A-6C show the first embodiment discussed above with the head section B rotated 180 degrees relative to the base section A from that shown in, e.g., FIGS. 5A-5C. As a result, as shown in the cross-sectional view of FIG. 6B, the head section B is oriented at a substantially more angled position in this second orientation. As should be appreciated, the degree of angular displacement between the linear position shown in, e.g., FIGS. 5A-5C and the angular or rotated position shown in FIGS. 6A-6C depends on the selected angle ø. In this regard, in various alternative embodiments the angle ø can be modified or altered depending on circumstances. In some illustrative embodiments, the angle ø can be selected, e.g., in a range of between about 5 and 45 degrees, or, more preferably, between about 15 and 35 degrees. By way of example, FIGS. 9A-9H show another illustrative embodiment of the invention having a larger degree of angular adjustment between the linear position shown in FIGS. 9A-9D and the angular position shown in FIGS. 9E-9H.

b. Illustrative Advantages of the First Embodiment

While the first embodiment of the invention shown in FIGS. 1-6C has many notable advantages over existing systems and devices, some of the noteworthy advantages include that the first embodiment of the invention provides an angularly adjustable spray device having a head section with a rotated turret combined with an angular adjustment mechanism that involves a 180 rotation of a head section with respect to a body section while the spray device is specially configured such that the discharge from the spray device always occurs from a like location from the face of the rotated turret. In particular, in the illustrated embodiment, the discharge is always directed from a top side of the turret when the spray device is in the normal use position as shown in FIGS. 10A and 10B, regardless of the angular orientation of the device being that shown in FIG. 10A or rotated 180 degrees to that shown in FIG. 10B. Towards that end, the flow paths shown in both FIGS. 5B and 6B depict the water flow to an upper side of the device regardless of the positional orientation of the head section B with respect to the base section A.

c. Second Illustrative Embodiment

FIGS. 7A-8E show another embodiment of the invention that is similar to the first embodiment, but with a number of modifications as discussed below. More particularly, FIGS. 7A-7E show views of the assembled spray device in a linear position and FIGS. 8A-8E show views of the assembled spray device in an angular position.

Figure 7A:
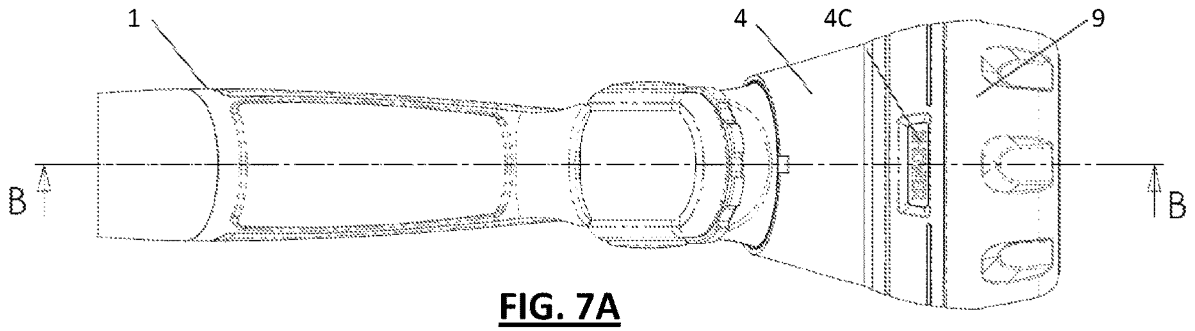
Figure 7B:
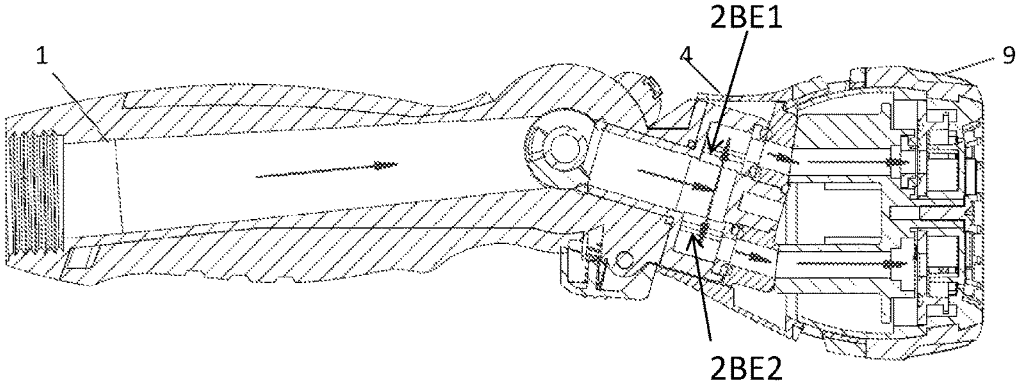
Figure 7C:
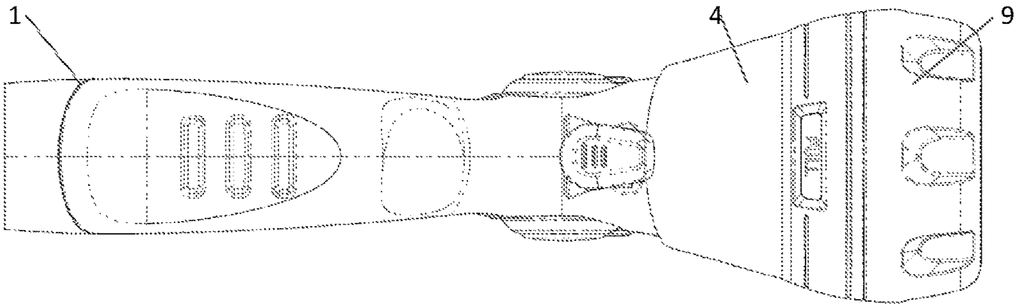

In contrast to the device shown in the first embodiment, as shown in FIG. 7B, in this second embodiment the diverter member 2 is modified to include two flow path openings 2BE1 and 2BE2 so that water flows through both of the upper and lower flow paths concurrently as shown by the arrows in FIG. 7B.

In this manner, as with the first embodiment, the location of the discharge of the water from the front face of the spray device will remain consistently the same regardless of the angular position of the head section B with respect to the base section A. However, in contrast to the first embodiment described above, the discharge in the second embodiment is from two locations.

Figure 7D:
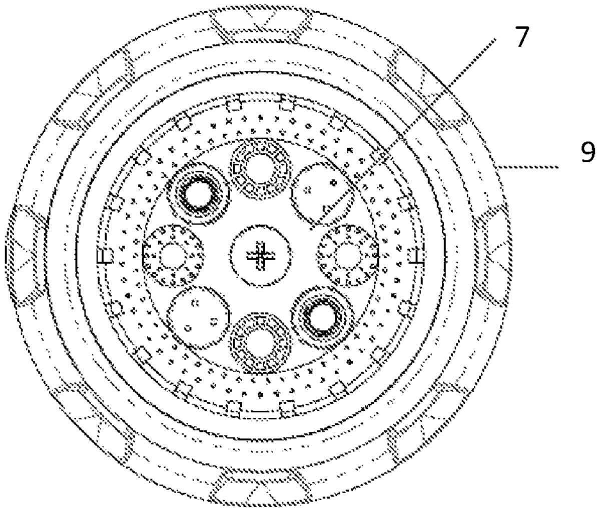
Figure 7E:
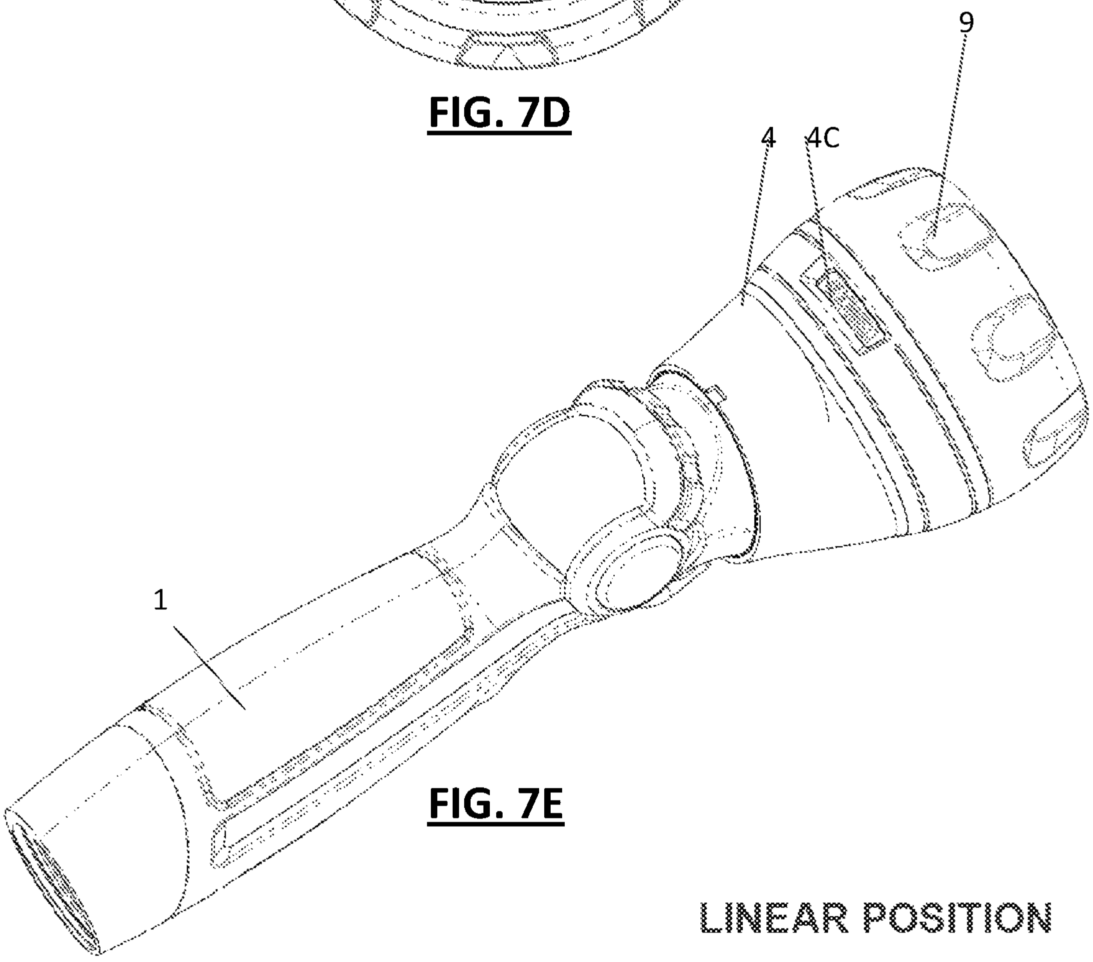
Figure 8A:
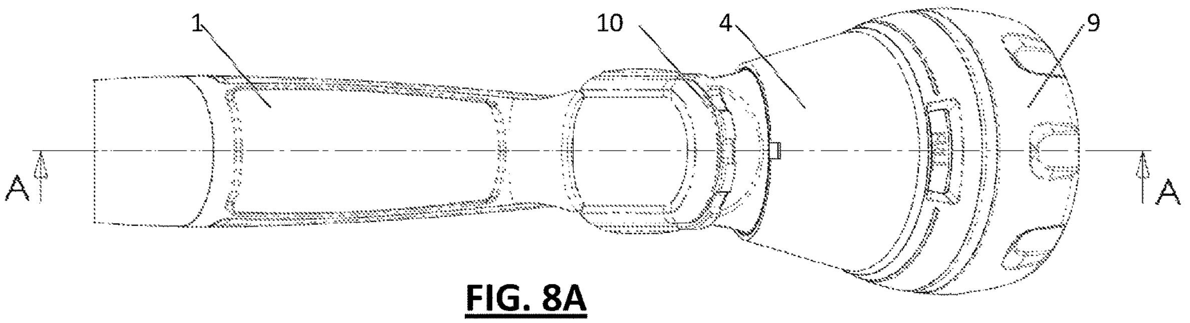
Figure 8B:
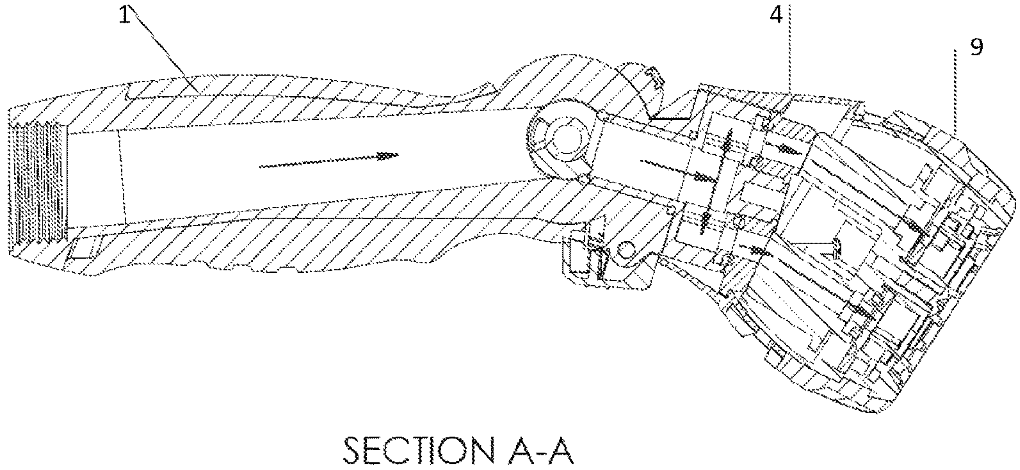
Figure 8C:
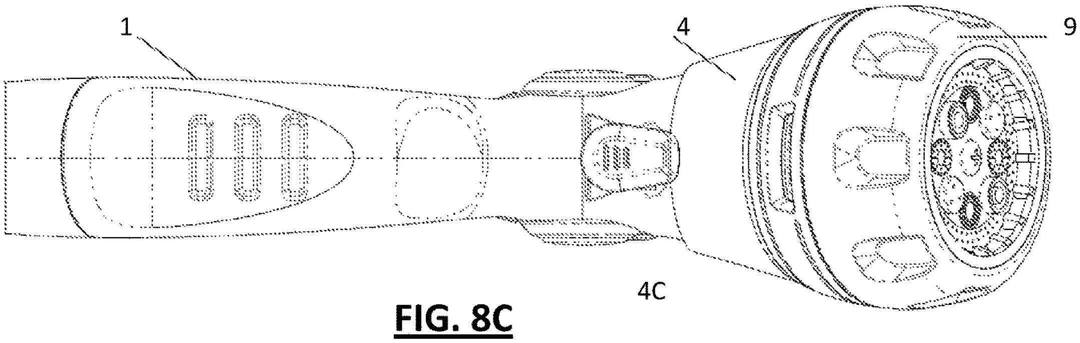
Figure 8D:
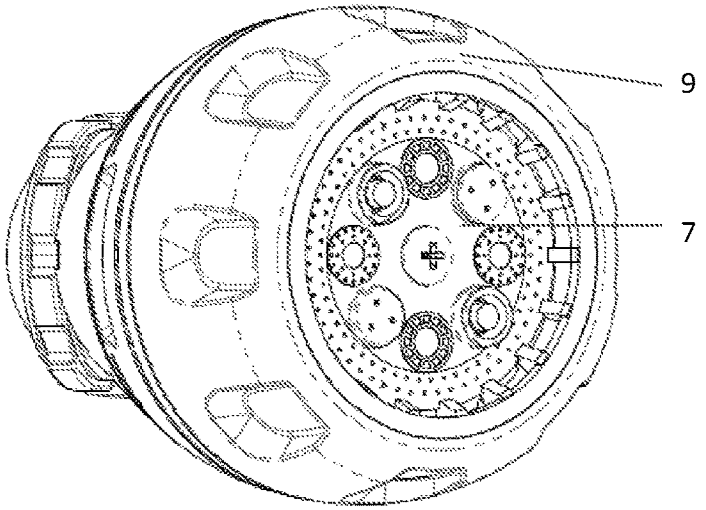
Figure 8E:
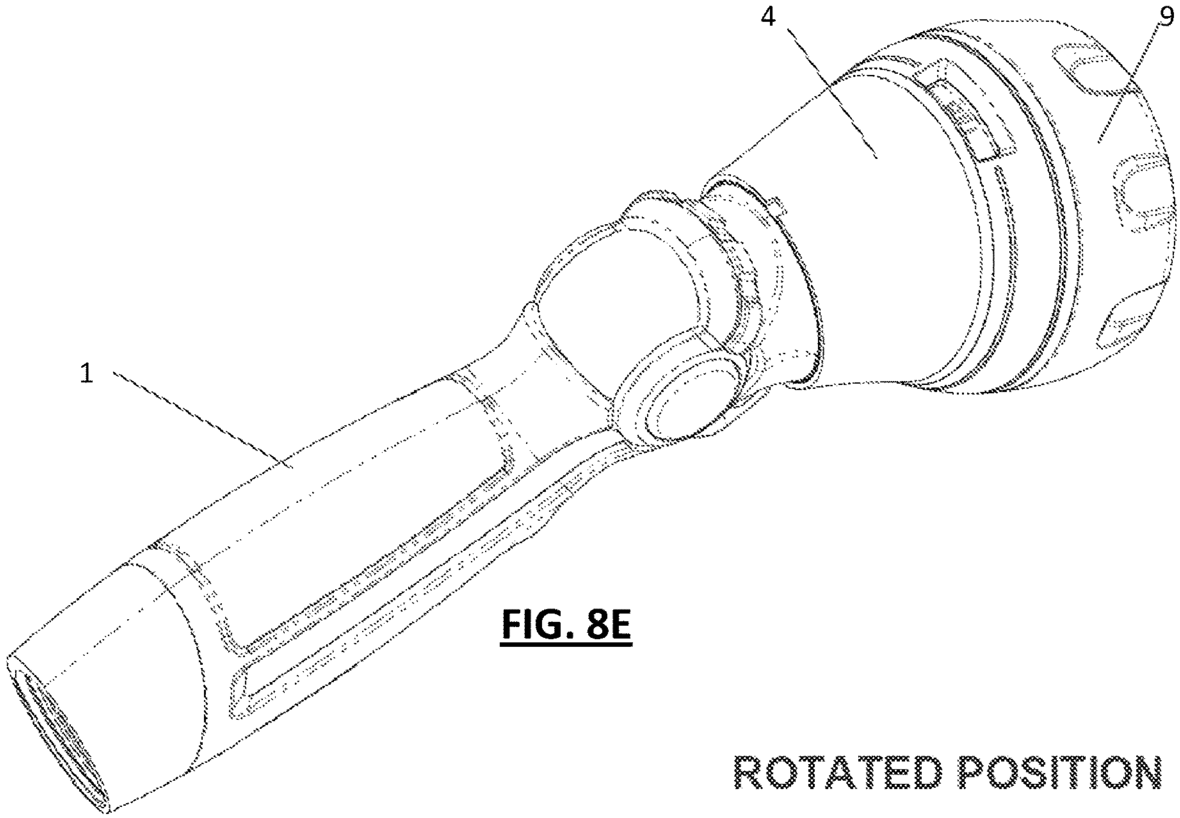
Figure 9A:
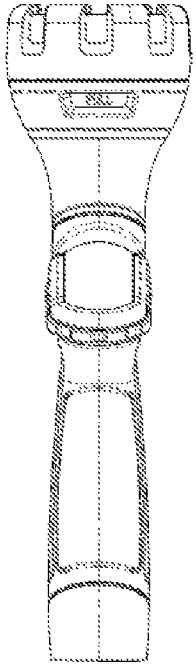
FIGS. 9A-9H are various views of another alternate third embodiment of a spray device similar to that shown in FIG. 1 in an assembled state, with FIGS. 9A-9D showing top, right side, bottom and left side views, respectively, of the assembled spray device in a linear position and FIGS.
Figure 9B:
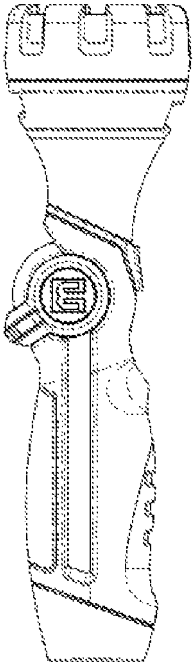
Figure 9C:
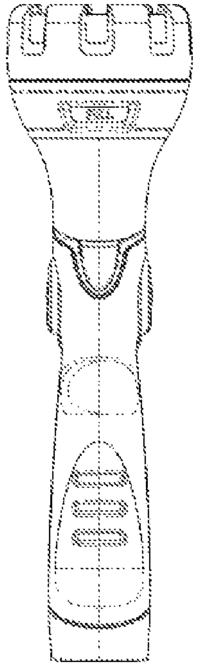
Figure 9D:
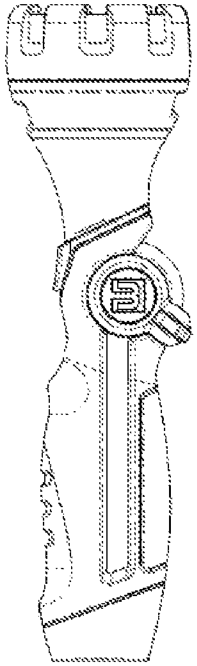
Figure 9E:
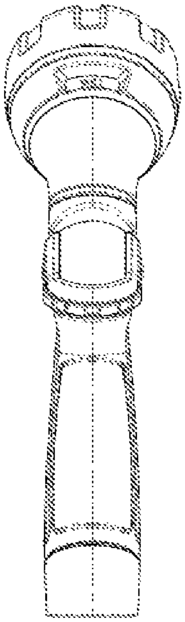
Figure 9F:
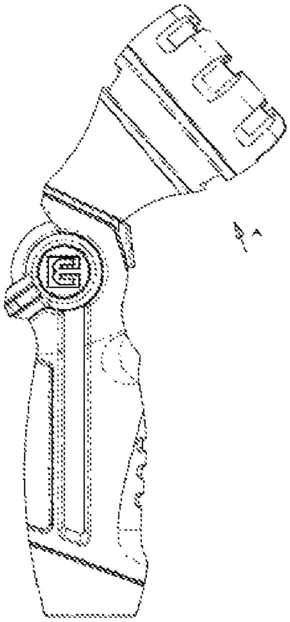
Figure 9G:
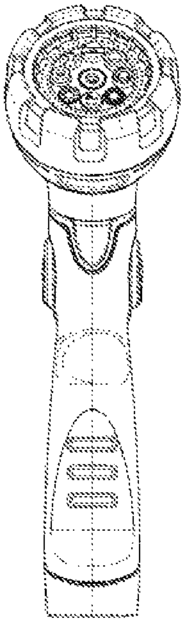
Figure 9H:
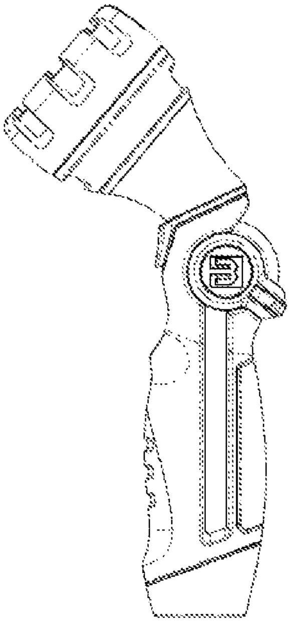

In view of this discharge from two locations, in some preferred embodiments as shown in FIGS. 7D, 8C and 8D, rather than including an array of different spray discharge ports around the entire periphery of the turret 7, in this second embodiment, the turret different spray discharge ports around the entire periphery of the turret 7, in this second embodiment, the turret 7 is modified so as to include like spray discharge ports situated 180 degrees apart from one another. In this manner, due to the dual discharge from the upper and lower regions of the turret 7 of the spray head, the sprays discharged from these upper and lower regions will be of the same type. Accordingly, this modification can be provided to avoid conflicting discharges from different spray types concurrently.

Accordingly, in the illustrated embodiment, the turret 7 only includes four different spray types, which are arranged as opposing pairs on opposite sides of the turret as shown.

Commensurate therewith, the indicia ring 6 would be similarly modified to include corresponding indicia surrounding the indicia ring. Towards that end, the indicia ring can include eight labels or indicia, with opposite labels (i.e., 180 degrees around the perimeter of the indicia ring being the same). Notably, in this manner, the indicia displayed in both windows 4C of the sleeve 4 will show an accurate spray type selection. In contrast, in the first embodiment having eight different spray types, if two display windows 4C are employed as shown in, e.g., FIGS. 1B and 3B, then only one of the display windows 4C will display an accurate result at a given time. Accordingly, in some preferred embodiments, the first embodiment described above would include only a single display window that is provided with the accurate position displayed.

d. Other Illustrative Embodiments

In yet some other embodiments of the invention, a combination of the first and second embodiments can be employed. For example, rather than employing a dual flow as shown in the second embodiment, in some alternative embodiments a single flow is provided that is the same as shown in the first embodiment, such as, e.g., in FIG. 5B. However, in this alternative embodiment, the turret 7 of the first embodiment is replaced with the turret 7 of the second embodiment. In addition, the indicia ring 6 would also be modified as set forth in the second embodiment. Accordingly, as shown in FIGS. 7D, 8C and 8D, rather than including an array of different spray discharge ports around the entire periphery of the turret 7, as in the second embodiment, the turret 7 is modified so as to include like spray discharge ports situated 180 degrees apart from one another. In this manner, regardless of the relative angular position of the spray device—e.g. regardless of whether in a linear position such as, e.g., shown in FIG. 10A or in a rotated or angular position such as, e.g., shown in FIG. 10B, the discharge would always be directed from a top side of the turret similar to the first embodiment, and the type of spray would not alter upon changing of the angular orientation of the spray head between the linear or angular positions. In addition, in this latter embodiment, the display of the indicia through the two windows 4C would always be accurate. And, furthermore, in this latter embodiment, the display window facing the user U while holding the device in the normal use position will always display the correct spray type indicia. Moreover, in this embodiment, there would be no concern of potential interference between dual discharges from the spray device as could possibly occur in some implementations of the second embodiment.

e. Additional Exemplary Embodiments

FIGS. 11A to 17 show an additional exemplary embodiment of the present invention.

The embodiment shown in these figures includes a handle portion 1000 which is similar to the handle 1 discussed above, and a thumb lever 110 which is similar to the thumb lever 10 discussed above. As shown, the thumb lever 110 includes a substantially U-shaped lever arm and two mounting rings. The thumb lever is mounted so as to straddle a thumb section of the base handle as shown in, e.g., FIG. 11A. A valve member 111 is fixed to the lever arm by fixedly engaging a cap portion to one of the mounting rings, and a shaft extends through a cross-passageway extending entirely laterally through the handle 1000. The distal end of the shaft is attached to another cap member that is fixedly mounted to the other mounting ring. The shaft supports a valve disc 111V that is sized and shaped to occlude the passageway in the handle at a particular orientation and to not occlude the passageway at another orientation. In use, the lever arm 110 is fixed to the valve member, while movable as a unit on the thumb section of the base handle 1000. In this manner, a user can simply push the lever 110 with the user's thumb or the like to open or close the flow of water via the spray device by movement of the valve disc 111V between fully closed (i.e., occluded) and fully opened positions.

With reference to FIG. 11A, the handle 1000 is formed, similarly to the prior-described embodiments, with a central passageway running lengthwise there-through. In use, the base end of the handle is connected to a hose (e.g., threaded to the hose) such that water can be directed through the handle. At a discharge port of the handle, a discharge tube 200VT is located through which all water passing through the handle 1000 passes. An inlet to the discharge tube 200VT is configured to be opened or closed by the valve 111V.

The discharge tube 200VT is fitted to an inlet of a tube member 200 which has a central channel aligned with the central passageway of the handle 100. The tube member 200 is fixedly mounted to the handle, such as, e.g., employing bolts BT which pass through bolt holes BH in the handle 1000 and into bolt holes 200BH in the tube member 200. Although the tube member 200, the discharge tube 200VT and the handle 1000 are separate members that are affixed together in this exemplary construction, in other embodiments two or all these components can be unitarily formed as a single member. As shown in FIG. 13, the tube member 200 is preferably constructed to provide a snap-fit connection to the rotary directing attachment member 500 (as discussed further below). Towards this end, the tube member preferably includes resilient spring members 200SP which resiliently engage an annular flange 500AF of the attachment member 500 as discussed below.

During assembly of the spray device, prior to connecting the attachment member 500 to the tube member 200, the attachment member 500 is fitted within the sleeve 400. In this regard, as shown in FIGS. 11A, 15, 16, the sleeve preferably includes supporting ribs 400RB, which abut an outer peripheral edge of a rear face of a cover plate portion 500PL of the attachment member 500.

After the attachment member 500 is mounted within the sleeve 400, the directing tube 500D of the attachment member is connected to the discharge end of the tube member 200. In this manner, water entering the handle of the spray device will pass through the tube member 200, and then through the directing tube 500D of the attachment member 500. In order to readily attach the attachment member 500 to the tube member 200, in the preferred construction, as discussed above, a snap fit connection is formed between these members. Towards that end, in the preferred construction, a rear end of the directing tube 500D of the attachment member 500 has an annular flange 500AF that is configured to be received inside the tube member 200 from the discharge opening of the tube member 200. As the annular flange 500AF enters the tube member 200, the annular flange 500AF outwardly pushes two resilient spring members 200SP formed on opposite sides of the tube member such that the spring members flare outwardly to allow the annular flange 500AF to pass. Once the annular flange passes the ends of the resilient spring members 200SP, the spring members snap inward by their resilient force and thereby lock the annular flange by the respective ends of the resilient spring members 200SP. This locked state is shown in FIG. 15 which depicts the snap-fit connection between the attachment member 500 and the tube member 200 within the sleeve 400. It should be appreciated that FIG. 15 only shows a portion of the components (i.e., portions located within the sleeve) for explanatory purposes.

With the above-described snap-fit connection between the attachment member 500 and the tube member 200, the attachment member 500 is configured to be rotationally supported within the tube member 200. As a result, the attachment member 500 can be rotated to alter the angle of discharge of water from the directing tube 500D of the attachment member 500. In order to manually rotate the attachment member by a user during use, the sleeve 400 is fixed to the attachment member 500 so as to not independently rotate relative to the attachment member 500. Towards that end, in some embodiments, one or more of the supporting ribs 400RB inside the sleeve 400 can be configured to be received within receiving slits 500SL formed in the cover plate portion 500PL of the attachment member 500. In this manner, when the attachment member 500 is received within the sleeve 400 and the combined structure is snap-fit to the tube member 200, the sleeve 400 and the attachment member 500 will rotate around the tube member 200 as a single unit.

As with the previously-described embodiments, in this latter embodiment, the sleeve member 400 is preferably rotatable between a straight or linear configuration, like that shown in FIG. 11B, and an angled configuration, like that shown in FIG. 12B. In addition, as with the previously-described embodiments, in this latter embodiment, the sleeve member 400 is preferably rotated 180 degrees between the straight configuration and the angled configuration.

In the preferred construction of this latter embodiment, in order to surely set the sleeve member 400 in either the straight configuration or the angled configuration, a snap-fit mechanism is provided to fix the orientation of the spray device. Towards that end, in some embodiments, the attachment member 500 also includes a snap-fit projection 500PR (see FIG. 14) that extends from a resilient arm protruding rearward from a rear side of the cover plate 500PL. The snap-fit projection is configured to be received within the annular groove 200G (see FIG. 14) of the tube member 200 when the attachment member is fully snap-fit connected to the tube member 200. In this manner, as the attachment member 500 rotates relative to the tube member 200, the snap-fit projection will rotate around the annular groove 200G. However, as shown in FIG. 13, the annular groove preferably includes two slot portions 200SL at opposite sides of the tube member 200 which are configured to receive the snap-fit projection 500PR, such as, e.g., shown in the state shown in FIG. 16. In that manner, the sleeve 400 can be snap-fit or "snapped" into either an angled or straight configuration. The amount of rotational force needed to be applied to the sleeve to exit this snap-fit state can be adjusted to allow a user to readily move the sleeve 400 as needed while maintaining the desired orientation during use.

As also shown in FIGS. 11A to 16, in this latter exemplary embodiment, the spray device also advantageously includes a turret member 700 having a plurality of selectable spray type port configurations (similarly to previously-described embodiments). As shown in, e.g., FIG. 11A, the turret member 700 can include a grommet ring 900 that includes finger-gripping recesses to facilitate manual rotation by a user of the turret member 700 that is fixed inside the grommet ring 900. As with the previously-described embodiments, in some embodiments, a turret cap 800 is fixed to the turret to facilitate fluid flow into the turret. The grommet ring 900, turret 700 and turret cap 800 are preferably integrally fixed to one another such as to move together as an integral unit.

As shown in FIG. 12A, when assembled as an integral unit, an exposed perimeter of the turret cap 800 preferably is provided with indicia that is viewable through at least one window 400C of the sleeve upon selection of a particular angular position between the turret 700 and the attachment member 500. More specifically, by setting the angular position between the turret and the attachment member, the directing tube 500D can be specifically aligned with a desired selectable spray type port configurations (similarly to previously-described embodiments). For example, as shown in FIG. 11B, the turret 700 preferably includes a plurality of spray type port configurations. As discussed above, each selectable spray type configuration involves a particular shape of a discharge outlet that causes water flowing there-through to take on a particular shape or characteristic. The particular number of selectable spray type port configurations can be selected as desired. For example, in some embodiments, eight or more configurations can be selected, in other embodiments, seven configurations can be selected, in other embodiments, six configurations can be selected, in other embodiments five configurations can be selected, in other embodiments four configurations can be selected, in other embodiments three configurations can be selected, and in other embodiments two configurations can be selected.

In some preferred embodiments, a discharge port of the attachment member 500 is fitted with an o-ring OR to help seal the flow of water between the exit of the discharge port and the entrance to the respective selectable spray type port of the turret cap 800. In some embodiments, the turret member 800 can include different spray types around the periphery of the turret cap (e.g., similar to that shown in the embodiment of FIG. 6D), while in some other embodiments, the turret member 800 can include similar spray types at multiple locations around the periphery of the turret cap (e.g., similar to that shown in the embodiment of FIG. 7D).

With reference to the schematic diagram shown in FIG. 17, in preferred implementations of the embodiment shown in FIGS. 11A-16, the spray device includes two windows 400C on opposite sides of the periphery of the sleeve 400, and a plurality of labels 800L located around the periphery of the turret cap 800 which are positionable aligned with the windows 400C for observation there-through. In the illustrative example shown in FIG. 17, eight labels 800L are provided.

As with the previously-described embodiments, the number of and the angular positions of the labels 800L correlates with the number of spray types and the angular positions of the respective spray types around the turret 700. In some embodiments, the labels at opposite sides of the turret cap 800 represent the same spray type. In that manner, during use, when a user holds the spray device in a straight configuration in a manner similar to that shown in FIG. 10A, the user can observe via a window 400C (TOP) at the top side of the sleeve facing the user the label 800L corresponding to the spray type setting; and, if the user rotates the sleeve (without rotating the turret 700 relative to the sleeve so as to maintain the same spray type) by 180 degrees so as to be in an angled configuration similar to that shown in FIG. 10B, the window 400C (BOTTOM) originally at the bottom side of the sleeve will be rotated to a top position facing the user with the respective label thereunder facing the user, such that the user can observe the spray type by readily looking downward in a similar manner through a window located at an upper side during use regardless of the straight or angled orientation of the spray device.

In some other embodiments, to facilitate operation in this manner, the spray types at opposite sides of the turret 700 can be the same types, such as similar to that shown in FIGS. 7D and 8D, whereby labels 800L at opposite sides of the turret cap 800 can readily be made the same while aligning with the same spray types when the labels 800L at opposite sides of the turret cap 800 represent the same spray types. In such embodiments, an even number of labels can be provided, such as, e.g., eight labels shown in FIG. 17 may correspond to four spray types being employed.

In some other embodiments, the orientations of the labels 800L will not exactly correspond to the orientations of the inlets to the spray types in the turret cap 800. For example, where an odd number of spray types are distributed around the turret 700, then labels 800L can be located on opposite sides of the turret cap 800 without interference between spray types. That is, in such an example differing spray types would not be situated 180 degrees opposite to one another, such that rotation of the sleeve by 180 degrees to bring the lower window 400C into a top position for viewing would readily continue to display the same spray type. In such cases, the number of labels 800L around the periphery of the turret cap would be double the number of inlets to the respective spray types around the turret cap.

For example, in the embodiment shown in FIG. 11, seven spray types are shown as employed. As shown in the schematic diagram of FIG. 18, in some implementations, seven spray types can have respective inlets or through holes 800E in the turret cap that can be respectively aligned with the outlet of the discharge tube 500D depending on the relative rotational position of the turret 700 related to the attachment member 500. As shown in FIG. 18, in this example fourteen labels 800L are provided around the periphery of the turret cap 800, which are equally spaced around the periphery of the turret cap, and positionable such that labels on opposite sides of the turret cap 800 align with respective ones of the windows 400C. As depicted by the dashed lines, in some examples each respective spray type has a corresponding inlet or through hole 800E and two labels 800L on opposite sides of the turret cap. In the schematic diagram shown in FIG. 18, corresponding labels 800L and inlets 800E for each spray type are connected with respective dashed lines. In this manner, the angular orientation of the sleeve 400 can be readily rotated such that the spray device is alternated between straight and angled configurations to alternate the positioning of the windows 400C (Top) and 400C (Bottom) without altering the type displayed view an upper window 400C when the relative angular positions of the turret cap 800 and the sleeve are not altered.

FIG. 19 is a schematic diagram that shows an alternative preferred construction of the window and labels of the sleeve 400 and turret cap 800 according to some preferred embodiments of the invention. In particular, in the embodiment shown in FIG. 18, the labels 800L and windows 400C (Top) and 400C (Bottom) are aligned at a common axial position (i.e., along an axis extending through a centerline of the turret cap), such that the labels pass under both of the windows 400C (Top) and 400C (Bottom) such as to be viewed thereunder when rotated to an aligned position with the respective window. In this latter embodiment, the arc length of the labels is more limited. In the embodiment shown in FIG. 19, the arc length of the labels 800L can be increased by arranging a plurality of rows of labels—e.g., rows R1 and R2 as shown in FIG. 19. As shown in FIG. 19, a top window 400C (Top) in the sleeve 400 is aligned with the row R1, while the bottom window 400C (Bottom) is aligned with the row R2. In the preferred embodiments, each of the rows R1 and R2 includes labels corresponding to each of the spray types employed (i.e., corresponding to the number of inlet holes into the turret cap 800). In the preferred embodiments, the same specific labels in row R1 are angularly offset around the turret cap from the labels in row R2 by 180 degrees. In that manner, the same spray type will be displayed via the top window 400C (top) and the bottom window 400C (bottom). Thus, regardless of the orientation of the spray device in a straight configuration or in an angled configuration, the correct spray type will be visible at a top side of the spray device when in a normal use position similar to that shown in FIGS. 10A and 10B.

It should be appreciated that FIG. 19 is an explanatory figure and not shown to scale. In some preferred embodiments, this type of structure shown in FIG. 19 is applied to any of the embodiments described herein-above. For example, with reference to FIGS. 9A-9H, as illustrated in these figures the windows at opposite sides of the sleeve are offset in a similar manner. In such example, this offset enables the use of two parallel rows of labels similar to that shown in FIG. 19. Similarly, a comparison of the windows shown in FIGS. 11B and 12B also illustrate that in these figures the windows at opposite sides of the sleeve are offset in a similar manner. Once again, also in this example, this offset enables the use of two parallel rows of labels similar to that shown in FIG. 19.

As shown in FIG. 11A, the spray device can, thus, include a base section A, including, e.g., the base handle 100 and the tube member 200 which is fixedly mounted thereto, along with a head section B that is rotatable supported on the base section A. As shown, the head section can include, e.g., the sleeve 400 having the attachment member 500 fixed therein, as well as a turret assembly C that is rotatably mounted to the attachment member. In this embodiment, the turret assembly includes the turret 700, the turret cap 800 and the grommet ring 900 which are fixedly connected together such as to rotate as a unitary member. In some embodiments, components of the turret assembly could be integrated together such as to be formed as a single unitary member.

During assembly of the device, the base section A is formed with the tube member 200 fixed to the handle 100, and the head section is readily attached to the base section by means of a snap-fit connection between the annular flange 500AF of the attachment member and the resilient spring members 200SP of the tube member 200 of the base section A. In the illustrated embodiment, the turret assembly C is rotatably mounted to the attachment member 500 via a screw SC that extends through the turret 700 and turret cap 800 of the turret assembly and is screwed into a central receiving screw hole 500SH in the attachment member 500. Preferably, the screw is not tightened too tightly that the turret assembly does not rotate relative to the sleeve 400 and attachment member 500, but such that frictional contact between the turret assembly and attachment member 500 maintains the orientation of the members until a user manually rotates the turret assembly C relative to the attachment member 500. In the preferred embodiment, the frictional contact between the attachment member 500 and the turret assembly is maintained by means of a spring biased pin PN that is supported in the attachment member such as to be biased towards the turret cap 800. In the preferred construction, the rear face of the turret cap 800 can include a plurality of recesses (not shown) which are arranged in similar manner to the recesses PR shown in the previously-described embodiments shown in FIG. 4A, which correspond to locations of the respective spray types selectable with the turret assembly in order to both identify the particular angular orientations for respective spray types and to help retain the respective orientation of the turret assembly until the user manually forces the turret assembly to rotate so as to cause the pin PN to be released from the respective recess. Towards that end, the tip of the pin is preferably rounded or contoured as shown to facilitate entry and exiting of the respective recess PR during use.

Broad Scope of the Invention

In the accompanying figures, the relative sizes and dimensions of all of the component parts of the spray devices are shown to scale according to some illustrative and non-limiting examples. In some variations of these illustrative embodiments, corresponding relationships between parts can be varied plus or minus 10%, or plus or minus 20% in other embodiments, or plus or minus 30% in other embodiments. Moreover, various other embodiments can employ wholly different sizes and dimensions.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of operating an angularly adjustable spray device, comprising:

1) providing said spray device comprising:

a base section having a water flow path extending lengthwise therethrough;

a head section aligned at an end of the base section and rotatably mounted to the base section; and a diverter member fixedly attached to a discharge outlet of a base handle of the base section, the diverter member comprising a tube configured to be received within the discharge outlet, a diverter cup, a first tubular conduit, and a second tubular conduit, wherein a front face of the base section is set at an acute angle with respect to a line perpendicular to a center axis of the base section such that when the head section is rotated a predetermined extent relative to the base section, said spray device is moved between a substantially linear position of the head section with respect to the base section to an angular position of the head section with respect to the base section;

wherein the head section includes a rotatable turret having a plurality of selectable spray discharge ports;

wherein said spray device is configured such that a location of water discharging from an end face of the head section is maintained despite rotation of the head section relative to the base section, wherein the first and second tubular conduits are in fluid communication with the tube, and wherein the diverter member is configured to divert the water flow path to the first and second tubular conduits, which are radially stepped from a center axis through the base section towards said head section of said spray device;

2) discharging the water from said spray device, wherein said spray device is in a substantially linear configuration; and 3) discharging the water from said spray device, wherein said spray device is in an angular configuration, wherein the location of the water discharged from the head section is generally maintained despite whether said spray device is in the substantially linear configuration or the angular configuration.

2. The method of operating an angularly adjustable spray device of claim 1, wherein a selected spray discharge port of a plurality of selectable spray discharge ports remains the same despite rotation of said head section relative to said base section between the substantially linear configuration and the angular configuration.

* * * * *